(12) United States Patent
Barkan et al.

(10) Patent No.: US 9,092,838 B2
(45) Date of Patent: Jul. 28, 2015

(54) METHOD AND SYSTEM FOR PROCESSING AN IMAGE FEATURING MULTIPLE SCALES

(71) Applicant: Ramot at Tel-Aviv University Ltd., Tel-Aviv (IL)

(72) Inventors: Yuval Barkan, Kfar-Sirkin (IL); Hedva Spitzer, Tel-Aviv (IL); Yael Faltin Gefen, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 13/759,155

(22) Filed: Feb. 5, 2013

(65) Prior Publication Data

US 2013/0148908 A1    Jun. 13, 2013

Related U.S. Application Data

(63) Continuation-in-part of application No. PCT/IL2011/000639, filed on Aug. 4, 2011.

(60) Provisional application No. 61/370,812, filed on Aug. 5, 2010.

(51) Int. Cl.
*G06K 9/00* (2006.01)
*G06T 9/00* (2006.01)
*G06T 5/50* (2006.01)

(52) U.S. Cl.
CPC ... *G06T 9/00* (2013.01); *G06T 5/50* (2013.01); *G06T 2207/20016* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 4,384,336 A | | 5/1983 | Frankle et al. |
| 5,012,333 A | * | 4/1991 | Lee et al. .................. 358/520 |
| 5,042,077 A | | 8/1991 | Burke |
| 5,343,254 A | | 8/1994 | Wada et al. |
| 5,717,791 A | | 2/1998 | Labaere et al. |

(Continued)

FOREIGN PATENT DOCUMENTS

| | | |
|---|---|---|
| EP | 0901671 | 9/2003 |
| WO | WO 95/33306 | 12/1995 |

(Continued)

OTHER PUBLICATIONS

Communication Pursuant to Article 96(2) EPC Dated Apr. 6, 2006 From the European Patent Office Re.: Application No. 04712652.9.

(Continued)

*Primary Examiner* — Tsung-Yin Tsai

(57) ABSTRACT

A method of processing an image is disclosed. The method comprises obtaining an image decomposed into a set of scaled images, each being characterized by a different image-scale; and calculating, for each of at least some scaled images, a relative luminance between the scaled image and another scaled image of the set, using intensities in the scaled image and intensities in the another scaled image. The method further comprises processing each scaled image using an adaptation procedure featuring an image-specific effective saturation function of the relative luminance, thereby providing a processed scaled image; combining at least some of the processed scaled images to provide a combined image; and outputting the combined image to a computer readable medium.

31 Claims, 17 Drawing Sheets
(5 of 17 Drawing Sheet(s) Filed in Color)

(56) References Cited

U.S. PATENT DOCUMENTS

| | | | |
|---|---|---|---|
| 5,991,456 A | 11/1999 | Rahman et al. | |
| 6,122,012 A | 9/2000 | Segman | |
| 6,211,515 B1* | 4/2001 | Chen et al. | 250/252.1 |
| 6,212,304 B1 | 4/2001 | Durg et al. | |
| 6,609,135 B1 | 8/2003 | Omori et al. | |
| 6,674,544 B2 | 1/2004 | Shiota et al. | |
| 6,717,698 B1* | 4/2004 | Lee | 358/1.9 |
| 6,724,435 B2 | 4/2004 | Segman | |
| 6,779,040 B1* | 8/2004 | Lee et al. | 709/247 |
| 6,788,822 B1 | 9/2004 | Zhang et al. | |
| 6,829,384 B2* | 12/2004 | Schneiderman et al. | 382/154 |
| 6,912,307 B2 | 6/2005 | Spitzer et al. | |
| 6,931,152 B2 | 8/2005 | Spitzer | |
| 6,947,176 B1 | 9/2005 | Kubo et al. | |
| 7,142,704 B2 | 11/2006 | Hara | |
| 7,260,266 B2* | 8/2007 | Nakajima et al. | 382/240 |
| 7,489,814 B2 | 2/2009 | Spitzer et al. | |
| 7,620,265 B1* | 11/2009 | Wolff et al. | 382/276 |
| 7,893,974 B2 | 2/2011 | Chiba | |
| 8,131,109 B2 | 3/2012 | Kim et al. | |
| 8,320,996 B2* | 11/2012 | Panasyuk et al. | 600/473 |
| 2001/0041004 A1 | 11/2001 | Shefer | |
| 2002/0154323 A1 | 10/2002 | Sobol et al. | |
| 2002/0159627 A1* | 10/2002 | Schneiderman et al. | 382/154 |
| 2003/0026494 A1 | 2/2003 | Woodell et al. | |
| 2003/0123719 A1 | 7/2003 | Kurahashi | |
| 2004/0066850 A1* | 4/2004 | Nakajima et al. | 375/240.19 |
| 2004/0091164 A1 | 5/2004 | Sakatani et al. | |
| 2004/0136600 A1* | 7/2004 | Yfantis | 382/232 |
| 2004/0165086 A1 | 8/2004 | Spitzer et al. | |
| 2005/0089240 A1 | 4/2005 | Gallagher et al. | |
| 2006/0013478 A1 | 1/2006 | Ito et al. | |
| 2006/0098897 A1* | 5/2006 | Dewaele | 382/294 |
| 2006/0119713 A1 | 6/2006 | Deguchi et al. | |
| 2006/0247514 A1* | 11/2006 | Panasyuk et al. | 600/410 |
| 2007/0071350 A1 | 3/2007 | Lee et al. | |
| 2007/0076127 A1 | 4/2007 | Abe et al. | |
| 2007/0269095 A1 | 11/2007 | Couwenhoven et al. | |
| 2008/0031538 A1 | 2/2008 | Jiang et al. | |
| 2009/0169102 A1* | 7/2009 | Zhang et al. | 382/167 |
| 2009/0303345 A1 | 12/2009 | Deguchi et al. | |
| 2010/0183071 A1* | 7/2010 | Segall et al. | 375/240.16 |
| 2011/0001842 A1 | 1/2011 | Spitzer et al. | |
| 2012/0201456 A1 | 8/2012 | El-Mahdy et al. | |
| 2012/0257808 A1 | 10/2012 | Spitzer et al. | |
| 2013/0011029 A1 | 1/2013 | Ron et al. | |

FOREIGN PATENT DOCUMENTS

| | | |
|---|---|---|
| WO | WO 2004/075535 | 9/2004 |
| WO | WO 2009/057106 | 5/2009 |
| WO | WO 2009/081394 | 7/2009 |
| WO | WO 2012/017440 | 2/2012 |

OTHER PUBLICATIONS

Official Action Dated May 29, 2008 From the US Patent and Trademark Office Re.: U.S. Appl. No. 10/369,671.
Communication Pursuant to Article 94(3) EPC Dated Dec. 1, 2011 From the European Patent Office Re.: Application No. 04712652.9.
Communication Pursuant to Article 94(3) EPC Dated May 25, 2009 From the European Patent Office Re.: Application No. 04712652.9.
Corrected International Search Report and the Written Opinion Dated Dec. 27, 2011 From the International Searching Authority Re. Application No. PCT/IL2011/000639.
International Preliminary Report on Patentability Dated Jul. 1, 2010 From the International Bureau of WIPO Re. Application No. PCT/IL2008/001623.
International Preliminary Report on Patentability Dated May 14, 2010 From the International Bureau of WIPO Re.: Application No. PCT/IL2008/001419.
International Search Report and the Written Opinion Dated Nov. 15, 2011 From the International Searching Authority Re. Application No. PCT/IL2011/000639.
International Search Report Dated Feb. 3, 2009 From the International Searching Authority Re.: Application No. PCT/IL2008/001419.
International Search Report Dated Apr. 9, 2009 From the International Searching Authority Re.: Application No. PCT/IL2008/001623.
Notice of Allowance Dated Oct. 31, 2008 From the US Patent and Trademark Office Re.: U.S. Appl. No. 10/369,671.
Official Action Dated Oct. 16, 2012 From the US Patent and Trademark Office Re. U.S. Appl. No. 12/808,731.
Written Opinion Dated Feb. 3, 2009 From the International Searching Authority Re.: Application No. PCT/IL2008/001419.
Written Opinion Dated Apr. 9, 2009 From the International Searching Authority Re.: Application No. PCT/IL2008/001623.
Bae et al. "Aortic and Hepatic Contrast Medium Enhancement at CT. Part I. Prediction With a Computer Model", Radiology, 207: 647-655, 1998.
Barkan et al. "Brightness Contrast-Contrast Induction Model Predicts Assimilation and Inverted Assimilation Effects", Journal of Vision, XP002659387, 8(7): 1-26, Oct. 17, 2008.
Barnes "Characteristics and Control of Contrast in CT", RadioGraphics, 12: 825-837, 1992.
Bartz et al. "Volumetric High Dynamic Range Windowing for Better Data Representation", Proceedings of the 4th International Conference on Computer Graphics, Virtual Reality, Visualization and Interaction in Africa, Cape Town, South Africa, AFRIGRAPH, p. 137-144, Jan. 25-27, 2006.
Burt et al. "The Laplacian Pyramid as a Compact Image Code", IEEE Transactions on Communications, Com-31(4): 532-540, Apr. 1983.
Chang et al. "Image Contrast Enhancement Based on a Histogram Transformation of Local Standard Deviation", IEEE Transcation on Medical Imaging, 17(4): 518-531, Aug. 1998.
Creutzfeldt et al. "The Neurophysiological Correlates of Colour and Brightness Contrast in Lateral Geniculate Neurons. II. Adaption and Surround Effects", Experimental Brain Research, 87: 22-45, 1991.
Creutzfeldt et al. "The Neurophysiological Correlates of Colour and Brightness Contrast6 in Lateral Geniculate Neurons. I. Population Analysis", Experimental Brain Research, 87: 3-21, 1991.
Cromartie et al. "Edge-Affected Context for Adaptive Contrast Enhancement", Proceedings of the XIIth International Meeting on Information Processing in Medical imaging: Lecture Notes in Computer Science, p. 474-485, 1991.
Duan et al. "Comprehensive Fast Tone Mapping for High Dynamic Range Image Visualization", Proceedings of Pacific Graphics, p. 1-9, 2005.
D'Zmura et al. "Contrast Gain Control", Color Vision: From Genes to Perception, Chap.19: 369-385, 1999.
Farbman et al. "Edge-Preserving Decompositions for Multi-Scale Tone and Detail Manipulation", ACM Transactions on Graphics, XP055011074, 27(3/Art.67): 67-1-67-10, Aug. 2008. Section 6.1.
Fattal et al. "Gradient Domain High Dynamic Range Compression", Proceedings of the ACM SIGGRAPH, p. 249-256, 2002.
Fattal et al. "Multiscale Shape and Detail Enhancement From Multi-Light Image Collections", ACM Transactions on Graphics, XP055011081, 26(3/Art.51): 51-1-51-9, Jul. 29, 2007. Sections 3-5, Fig.2.
Fayad et al. "Chest CT Window Settings With Multiscale Adaptive Histogram Equalization: Pilot Study", Radiology, 223: 845-852, 2002.
Hara et al. "Generalized Dynamic Range Compresiion Algorithm for Visualization of Chest CT Images", Medical Imaging 2004: Visualization, Image-Guided Procedures, and Display, Proceedings of the SPIE, 5367: 578-585, 2004.
Ji et al. "Adaptive Image Contrast Enhancement Based on Human Visual Properties", IEEE Transactions on Medical Imgaing, 13(4): 573-568, Dec. 1994.
Jin et al. "Contrast Enhancement by Multi-Scale Adaptive Histogram Equalization", SPIE Proceedings Series, 4478: 206-213, 2001.
Jobson et al. "A Multiscale Retinex for Bridging the Gap Between Color Images and the Human Observation of Scenes", IEEE Transactions on Image Processing, 6(7): 965-976, 1997.
John et al. "Performance of a Single Lookup Table (LUT) for Displaying Chest CT Images", Academic Radiology, 11: 609-616, 2004.

(56) References Cited

OTHER PUBLICATIONS

Lehr et al. "Body Computed Tomography: Histogram Equalization of CT Images", Radiology, 154: 163-169, 1985.
Lerman et al. "Contrast Enhancement of Soft Tissues in Computed Tomography Images", Medical Imaging 2006: Image Processing, Proceedings of the SPIE, 6144: 2103-2110, 2006.
Li et al. "Compressing and Companding High Dynamic Range Images With Subband Architectures", ACM Transactions on Graphics, Proceedings of ACM SIGGRAPH, XP003010943, 24(3): 836-844, Jul. 1, 2005.
Li et al. "Compressing and Companding High Dynamic Range-Images With Subband Architectures", Proceedings of ACM SIGGRAPH 2005, ACM Transactions on Graphics, XP003010843, 24(3): 836-844, Jul. 2005.
Mead "Analog VLSI and Neural Systems", Table of Contents, Addison-Wesley, XV-XXII, 1989.
Naka et al. "S-Potentials From Colour Units in the Retina of Fish (Cyprinidae)", Journal of Physiology, 185: 536-555, 1966.
Norman et al. "Cone Photoreceptor Physiology and Cone Contributions to Colour Vision", The Perception of Colour, p. 146-162, 1991.
Olzak et al. "Multiple Gain Control Processes in Contrast-Contrast Phenomena", Vision Research, 39: 3983-3987, 1999.
Pattanaik et al. "Adaptive Gain Control for High Dynamic Range Image Display", Proceedings of Spring Conference in Computer Graphics (SCCG2002), Budmerice, Slovakia, 7 P., 2002.
Pizer et al. "Adaptive Histogram Equalization and Its Variations", Computer Vision, Graphics, and Image Processing, 39: 355-368, 1987.
Pizer et al. "Contrast-Limited Adaptive Histogram Equalization: Speed and Effectiveness", Proceedings of the First Conference on Visualization in Biomedical Computing, Atlanta, GA, USA, p. 337-345, May 22-25, 1990.
Rahman et al. "A Multiscale Retinex for Color Rendition and Dynamic Range Compression", SPIE International Symposium on Optical Science, Engineering, and Instrumentation, Applications of Digital Image Processing XIV, 2825: 9 P., 1996.
Rizzi et al. "A Modified Algorithm for Perceived Contrast Measure in Digital Images", 4th European Conference on Graphics, Imaging and Vision, 10th International Sympoium on Multispectral Color Science: CGIV/MCS'08, Jun. 9-13, 2008, Barcelona, Espana, Final Program and Proceedings, p. 249-252, 2008.
Socolinsky "Dynamic Range Constraints in Image Fusion and Visualization", Proceedings of the Signal and Image Processing, 6 P., 2000.
Spitzer et al. "Biological Gain Control for High Dynamic Range Compression", Final Program and Proceedings of the IS & T & SID—11th Color Imaging Conference: Color Science and Engineering: Systems, Technologies, Applications, p. 42-50, 2003.
Spitzer et al. "Biological Gain Control for High Dynamic Range Compression", Final Program and Proceedings of the IS&T/SID 11th Color Imaging Conference: Color Science, Systems, and Applications, Scottdale, Arizona, USA, XP002282584, p. 42-50, Nov. 3, 2003. p. 42-45, Fig.1.
Spitzer et al. "Color Constancy: A Biological Model and Its Application for Still and Video Images", Pattern Recognition, 35(8): 1645-1659, 2002. Abstract, Sec.2: Model From p. 1646-1649, Sec.4.4: Video Sequences, p. 1656-1658, Fig.1.
Spitzer et al. "Improvement of Illumination Artifacts in Medical Ultrasound Images Using a Biologically Based Algorithm for Compression of Wide Dynamic Range", Proceedings of the 2004 11th IEEE International Conference on Electronics, Circuits and Systems, ICECS 2004, Tel Aviv, Israel, Dec. 13-15, 2004, XP010774289, p. 435-438, Dec. 13, 2004.
Stark "Adaptive Image Contrast Enhancement Using Generalizations of Histogram Equalization", IRRR Transactions in Image Processing, 9(5): 889-896, May 2000.
Toet "Adaptive Multi-Scale Contrast Enhencement Through Non-Linear Pyramid Recombination", Pattern Recognition Letters, XP000168635, 11(11): 735-742, Nov. 1, 1990. Abstract, Sections 2-3.
Wyszecki et al. "Color Science Concepts and Methods, Quantitative Data and Formulae", Wiley & Sons, 2000. Short Description. p. 156-166.
Xing et al. "Measurement and Modeling of Center-Surround Suppression and Enhancement", Vision Research, 41: 571-583, 2001.
Yu et al. "A Fast and Adaptive Method for Image Contrast Enhancement", IEEE International Conference on Image Processing, ICIP 2004, Singapore, Oct. 24-27, 2004, 4 P., 2004.
Zimmerman et al. "An Evaluation of the Effectiveness of Adaptive Histogram Equalization for Contrast Enhancement", IEEE Transactions on Medical Imaging, 7(4): 304312, Dec. 1988.
Zuiderveld "Contrast limited Adaptive Histogram Equalization", Academic Press Graphics Gems Series, Graphic Gems IV, Chap. VIII.5: 474-485, 1994.
International Preliminary Report on Patentability Dated Feb. 14, 2013 From the International Bureau of WIPO Re. Application No. PCT/IL2011/000639.
Office Action Dated Oct. 13, 2013 From the Israel Patent Office Re. Application No. 206474 and Its Translation Into English.
Official Action Dated Mar. 13, 2013 From the US Patent and Trademark Office Re. U.S. Appl. No. 12/740,351.
Official Action Dated Nov. 19, 2013 From the US Patent and Trademark Office Re. U.S. Appl. No. 12/740,351.
Chaturvedi et al. "2-D Companding for Noise Reduction in Strain Imaging", IEEE Transactions on Ultrasonics, Perroelectrics, and Frequency Control, 45(1): 179-191, Jan. 1998.
Greenleaf et al. "Selected Methods for Image Elastic Properties of Biological Tissues", Annual Review of Biomedical Engineering, 5: 57-78, 2003.

\* cited by examiner

METHOD AND SYSTEM FOR PROCESSING AN IMAGE FEATURING MULTIPLE SCALES

RELATED APPLICATIONS

This application is a Continuation-in-Part of PCT Patent Application No. PCT/IL2011/000639 having International filing date of Aug. 4, 2011, which claims the benefit of priority under 35 USC §119(e) of U.S. Provisional Patent Application No. 61/370,812 filed on Aug. 5, 2010. The contents of the above applications are all incorporated by reference as if fully set forth herein in their entirety.

FIELD AND BACKGROUND OF THE INVENTION

The present invention, in some embodiments thereof, relates to image processing. Specifically, the present embodiments can be used for providing an automatic dynamic range modulation of a digital image. In various exemplary embodiments of the invention the method and/or apparatus is used for companding (compressing and expanding) a high dynamic range (HDR) image. The present embodiments further comprise an imaging system.

High dynamic range imaging (HDRI) is a set of techniques that allow a far greater dynamic range of exposures (large difference between light and dark areas) than normal digital imaging techniques. The intention of HDRI is to accurately represent the wide range of intensity levels found in real scenes ranging from direct sunlight to the deepest shadows.

HDRI was originally developed for use with purely computer-generated images. Later, methods were developed to produce a HDR image from a set of photos taken with a range of exposures. With the rising popularity of digital cameras and easy to use desktop software, many amateur photographers have used HDRI methods to create photos of scenes with a high dynamic range.

HDR images require a higher number of bits per color channel than traditional images, both because of the linear encoding and because they need to represent values from $10^{-4}$ to $10^8$ (the range of visible luminance values) or more. 16-bit ("half precision") or 32-bit floating point numbers are often used to represent HDR pixels. However, when the appropriate transfer function is used, HDR pixels for some applications can be represented with as few as 10-12 bits for luminance and 8 bits for chrominance without introducing any visible quantization artifacts.

Digital images may contain a huge amount of data, especially for high quality display and printing. Commercially available digital imaging devices are known to acquire image information across a wide dynamic range of several orders of magnitude. Additionally, there are software solutions which fuse multiple exposures of the same scene at lower dynamic range into one image of higher dynamic range.

Typically, although at the time of image capture the acquired dynamic range is rather large, a substantial portion of it is lost once the image is digitized, printed or displayed. For example, most images are digitized to 8-bits (256 levels) per color-band, i.e., a dynamic range of about two orders of magnitude. The problem is aggravated once the image is transferred to a display or a print medium which is often limited to about 50 levels per color-band.

International Publication No. WO2009/081394, the contents of which are hereby incorporated by reference discloses an image processing technique in which a digital HDR image is processed using two adaptation procedures employed on the achromatic channel of the digital image. Each adaptation procedure incorporates a different effective saturation function of the intensity. The adaptation procedures mimic the operation of the physiological visual system, wherein the first procedure mimics the "on" retinal pathway and the second adaptation procedure mimics the "off" retinal pathways. The intensity level of each picture-element of the digital image is processed by both procedures. The result of each processing is an intermediate intensity level. All the intermediate intensity levels of the picture-element are then combined to provide a new achromatic intensity.

SUMMARY OF THE INVENTION

According to an aspect of some embodiments of the present invention there is provided a method of processing an image. The method comprises: obtaining an image decomposed into a set of scaled images, each being characterized by a different image-scale; processing each scaled image of the set using an adaptation procedure featuring an image-specific effective saturation function of intensities in the scaled image and intensities in another scaled image of the set, thereby providing a processed scaled image; combining at least some of the processed scaled images to provide a combined image; and outputting the combined image to a computer readable medium.

According to some embodiments of the present invention the method comprises, for each of at least some scaled image of the set, calculating a relative luminance between the scaled image and another scaled image of the set, using intensities in the scaled image and intensities in the another scaled image. According to some embodiments of the present invention the image-specific effective saturation function is a function of the relative luminance.

According to some embodiments of the present invention the method comprises receiving the image and decomposing the image into the set of scaled images.

According to some embodiments of the invention the decomposing comprises selecting a size of the set based on a size of the image.

According to some embodiments of the invention the decomposing comprises determining an amount of information in each scaled image being formed, and ceasing the decomposing when the amount of information is below a predetermined threshold.

According to an aspect of some embodiments of the present invention there is provided a method of capturing and displaying an image. The method comprises capturing an image of a scene and processing the image using the method as delineated above.

According to some embodiments of the present invention the method comprises recording radiation selected from the group consisting of visible light, infrared light, ultraviolet light, X-ray radiation, radiofrequency radiation, microwave radiation and ultrasound radiation, thereby capturing the image.

According to an aspect of some embodiments of the present invention there is provided a computer software product, comprising a computer-readable medium in which program instructions are stored, which instructions, when read by a computer, cause the computer to execute the method as delineated above.

According to an aspect of some embodiments of the present invention there is provided a system for processing an image, the system comprises a data processor configured for: decomposing the image into a set of scaled images, each being characterized by a different image-scale; processing each scaled image of the set using an adaptation procedure featuring an image-specific effective saturation function of intensities in the scaled image and intensities in another scaled image of the set, thereby providing a processed scaled image; and combining at least some of the processed scaled images to provide a combined image.

According to some embodiments of the present invention the data processor calculates, for each scaled image of the set, a relative luminance between the scaled image and another scaled image of the set using intensities in the scaled image and intensities in the another scaled image. According to some embodiments of the present invention the image-specific effective saturation function is a function of the relative luminance.

According to an aspect of some embodiments of the present invention there is provided an imaging system. The imaging system comprises an image capturing system and the processing system as delineated above.

According to some embodiments of the present invention the image capturing system is selected from the group consisting of a digital camera, a video camera, a CMOS digital camera, an infrared camera, an X-ray camera, a scanner, a microwave imaging, a computerized tomography scanner, a magnetic resonance imaging scanner, a mammography scanner, an ultrasonic scanner, an impedance imaging system, an endoscopic imaging device, a radio telescope, a digital telescope, a digital microscope and a system for translating an analog image to a digital image.

According to some embodiments of the present invention a characteristic dynamic range of the combined image is lower than a characteristic dynamic range of the original image.

According to some embodiments of the present invention the scaled images are combined by multiplication.

According to some embodiments of the present invention the set is an ordered set and wherein the relative luminance is expressed as function of a ratio between the intensities in the scaled image and the intensities in the other scaled image.

According to some embodiments of the present invention the image-specific effective saturation function comprises an image-specific exponent, which is a function of a local contrast within the scale-image.

According to some embodiments of the present invention the processing comprises modulating each relative luminance to provide a plurality of modulated relative luminance levels, wherein the combining comprises combining the modulated relative luminance levels.

According to some embodiments of the present invention the modulating comprises selecting a relative luminance level such that two effective saturation functions corresponding to different image-specific exponent but the same scale are substantially matched, more preferably substantially equal.

According to some embodiments of the present invention the local contrast is calculated using a contrast-based adaptation procedure employed for each picture-element of the scaled image.

According to some embodiments of the present invention the contrast-based adaptation procedure calculates the local contrast based on a difference between a second order opponent receptive field function calculated for the picture-element and a second order opponent receptive field function calculated for nearby picture-elements.

According to some embodiments of the present invention the image-specific exponent is a decreasing function of the local contrast.

According to some embodiments of the present invention the image-specific exponent is a linear decreasing function of the local contrast.

According to some embodiments of the present invention the image-specific effective saturation function comprises a modulation function which is calculated based on a local contrast.

According to some embodiments of the present invention the modulation function has higher values when the local contrast is low, and lower values when the local contrast is high.

According to some embodiments of the present invention the method comprises employing a global gain operation for all scaled images of the set.

According to some embodiments of the present invention the global gain operation features a global gain exponent, and the method comprises calculating the global gain exponent using an optimization procedure.

According to some embodiments of the present invention the optimization procedure comprises selecting a set of candidate gain exponents, assigning a score to each candidate gain exponent, and selecting the gain exponent responsively to the score.

According to some embodiments of the present invention the score comprises a characteristic contrast.

According to some embodiments of the present invention the set is an ordered set and wherein the scaled image and the other scaled image are adjacent images in the set.

According to some embodiments of the present invention the image is an HDR image.

According to some embodiments of the present invention the image is of at least one type selected from the group consisting of a visible light image, a stills image, a video image, an X-ray image, an infrared image, a thermal image, a ultraviolet image, a computerized tomography (CT) image, a mammography image, a Roentgen image, a positron emission tomography (PET) image, a magnetic resonance image, an ultrasound images, an impedance image, an elastography image, and a single photon emission computed tomography (SPECT) image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram illustrating a method suitable for processing an image, according to some embodiments of the present invention;

FIGS. 2A and 2B are plots of processed intensities R as a function of a relative luminance q, according to some embodiments of the present invention;

FIGS. 3A and 3B are schematic illustrations of rectangular grids of picture-elements which exemplify a concept of picture-element regions, according to various exemplary embodiments of the invention;

FIG. 4 is a schematic illustration of a system for processing an image, according to some embodiments of the present invention;

FIG. 5 is a schematic illustration of an imaging system, according to some embodiments of the present invention;

FIGS. 6A and 6B show a thermal image before (6A) and after (6B) processing according to some embodiments of the present invention;

FIGS. 7A and 7B show another thermal image before (7A) and after (7B) processing according to some embodiments of the present invention;

FIGS. 8A and 8B show another thermal image before (8A) and after (8B) processing according to some embodiments of the present invention;

FIGS. 9A and 9B show another thermal image before (9A) and after (9B) processing according to some embodiments of the present invention;

FIGS. 10A and 10B show another thermal image before (10A) and after (10B) processing according to some embodiments of the present invention;

FIGS. 11A and 11B show another thermal image before (11A) and after (11B) processing according to some embodiments of the present invention;

Figures 18A, 18B:

FIGS. 12A-D show high dynamic range images, processed according to some embodiments of the present invention;

FIGS. 13A-F show a Gaussian pyramid obtained according to some embodiments of the present invention for a set of six scaled images;

FIGS. 14A-E show a luminance pyramid obtained according to some embodiments of the present invention from the Gaussian pyramid of FIGS. 13A-F;

FIGS. 15A-E show a local contrast pyramid obtained according to some embodiments of the present invention from the luminance pyramid of FIGS. 14A-E;

FIGS. 16A-E show a representation pyramid corresponding to a set of exponents obtained according to some embodiments of the present invention from the local contrast pyramid of FIGS. 15A-E;

FIGS. 17A-E show a saturation pyramid obtained according to some embodiments of the present invention from the exponents corresponding to the pyramid of FIGS. 16A-E; and FIGS. 18A and 18B show an input image and an image processed according to some embodiments of the present invention using the pyramids of FIGS. 13A-17E.

DESCRIPTION OF SPECIFIC EMBODIMENTS OF THE INVENTION

The present invention, in some embodiments thereof, relates to image processing. Specifically, the present embodiments can be used for providing an automatic dynamic range modulation of a digital image. In various exemplary embodiments of the invention the method and/or apparatus is used for companding (compressing and expanding) a high dynamic range (HDR) image. The present embodiments further comprise an imaging system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments are concerned with method and system for processing an image to facilitate its display. At least part of the processing can be implemented by a data processing system, e.g., a dedicated circuitry or a general purpose computer, configured for receiving the image and executing the operations described below.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The image to be analyzed using the teachings of the present embodiments is generally in the form of imagery data arranged gridwise in a plurality of picture-elements (e.g., pixels, group of pixels, etc.).

The term "pixel" is sometimes abbreviated herein to indicate a picture-element. However, this is not intended to limit the meaning of the term "picture-element" which refers to a unit of the composition of an image.

References to an "image" herein are, inter alia, references to values at picture-elements treated collectively as an array. Thus, the term "image" as used herein also encompasses a mathematical object which does not necessarily correspond to a physical object. The original and processed images certainly do correspond to physical objects which are the scene from which the imaging data are acquired.

Each pixel in the image can be associated with a single digital intensity value, in which case the image is a grayscale image. Alternatively, each pixel is associated with three or more digital intensity values sampling the amount of light at three or more different color channels (e.g., red, green and blue) in which case the image is a color image. Also contemplated are images in which each pixel is associated with a mantissa for each color channels and a common exponent (e.g., the so-called RGBE format). Such images are known as "high dynamic range" images.

The input image can be provided by any imaging modality, including, without limitation, a digital camera, a video camera, a CMOS digital camera, an infrared camera, a thermography device, an X-ray camera, a scanner, a microwave imaging, a computerized tomography scanner, a single photon emission computed tomography device, a magnetic resonance imaging scanner, a mammography scanner, an ultrasonic scanner, an impedance imaging system, an endoscopic imaging device, an elastography device, a radio telescope, a digital telescope, a digital microscope and a system for translating an analog image to a digital image.

Commercially available digital imaging devices based upon CCD detector arrays are known to acquire image information across a wide dynamic range of the order of 2 to 3 orders of magnitude. It is expected that with the rapid technologically development in the field of digital imaging, this range will most likely be broadened in the near future. Typically however, although at the time of image capture the acquired dynamic range is rather large, a substantial portion of it is lost once the image is digitized, printed or displayed. For example, most images are digitized to 8-bits (256 levels) per color-band, i.e., a dynamic range of about two orders of magnitude. The problem is aggravated once the image is transferred to a display or a print medium which is often limited to about 50 levels per color-band.

A novel imaging technology, recently developed, employs CMOS with active pixel sensors [O. Yadid-Pecht and E. Fossum, "Image Sensor With Ultra-High-Linear-Dynamic Range Utilizing Dual Output CMOS Active Pixel Sensors", *IEEE Trans. Elec. Dev.*, Special issue on solid state image sensors, Vol. 44, No. 10, 1721-1724], which are capable of locally adjusting the dynamical range, hence to provide a high quality image with high dynamic range.

In addition, over the past years software solutions were developed for fuse multiple exposures of the same scene at low dynamic range (e.g., 256 levels per color-band) into one high dynamic range image (of about 4 orders of magnitudes). High dynamic range images are typically provided in an RGBE format. In this format, 4 bytes are used (as opposed to 3 bytes in conventional images) to create a representation similar to floating point, where the first three bytes represent the three RGB color channels and the forth byte represents a common exponent to the three colors channels. The dynamic range of such images is about 4 orders of magnitude.

The motivation for developing imaging devices capable of capturing high dynamic range images is explained by the enormous gap between the performances of the presently available devices and the ability of the human visual system to acquire detailed information from an ultra-high dynamic range scene. Specifically, the human visual system, which is capable of acquiring a dynamic range of 14 orders of magnitude, can easily recognize objects in natural light having a dynamic range of 12 orders of magnitude.

Still, there is a growing gap between the state-of-the-art imaging devices and display devices. High quality images, obtained either with photographical film or by digital cameras, suffer, once displayed on a screen or printed as a hard copy from loss in clarity of details and colors at extreme light intensities, within shadows, dark regions, extremely bright regions and/or surfaces close to a lightening source. For example, as a single sharp edge in natural scene (e.g., a shaded object in illuminated scene) can reach a dynamic range of 2 orders of magnitudes, presently available display devices may not be able to recognize such an edge. Another severe problem is that in a specific exposure a dark region of the image may be seen while a bright region is over exposed, or vise versa.

The technique developed by the present inventor is suitable for HDR images as well as other images.

Figure 1:
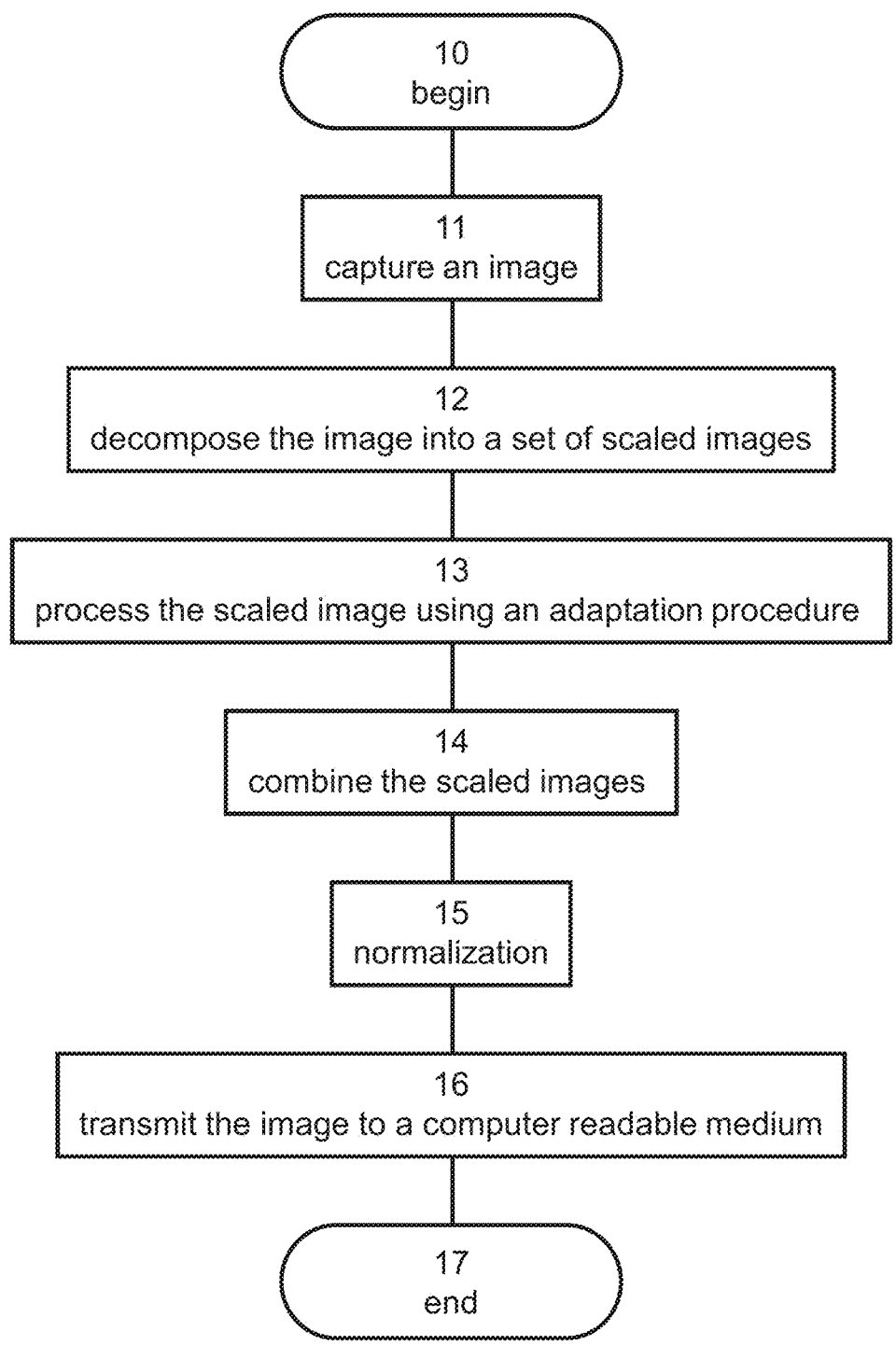

Referring now to the drawings, FIG. 1 is a flowchart diagram illustrating a method suitable for processing an image, according to some embodiments of the present invention. The method of the present embodiments can be used for processing any image including, without limitation, a visible light image, a stills image, a video image, an X-ray image, a thermal image, a ultraviolet image, a computerized tomography (CT) image, a mammography image, a Roentgen image, a positron emission tomography (PET) image, a magnetic resonance image, an ultrasound images, an impedance image, and a single photon emission computed tomography (SPECT) image.

The method begins at 10 and optionally continues to 11 at an image of a scene is captured. The image can be captured using any imaging technique known in the art, including, without limitation, visible light imaging, infrared light imaging, ultraviolet light imaging, X-ray imaging, radiofrequency imaging, microwave imaging and ultrasound imaging. The imaged scene can be of any type, including, without limitation, an outdoor scene, an indoor scene, a nearby scene, a remote scene, an astronomical scene, an underwater scene, an intracorporeal scene (namely a scene that includes internal organs of a subject), an extracorporeal scene (namely a scene that includes external organs of a subject), and any combination thereof.

Alternatively, 11 can be skipped in which case an image is received as a stream of imaging data, as further detailed hereinabove.

In some embodiments of the present invention, the imaged is subjected to a preprocessing operation, such as, but not limited to, the preprocessing operation described in International Patent Application No. PCT/IL2008/001419, the contents of which are hereby incorporated by reference. This embodiment is particularly useful when the image is formed by a computerized tomography technique, e.g., CT of SPECT.

At 12 the image is optionally and preferably decomposed into a set of scaled images, each being characterized by a different image-scale. Alternatively, 12 can be skipped, in which case the set of scaled images is received by the method from an external source.

In various exemplary embodiments of the invention the set is an ordered set, wherein the kth element of the set is a blurred version of the k−1 element. In other words, the images in the set are ordered such that the resolution of the k−1 image is finer than the resolution of the kth image. The decomposition 12 can be done using any procedure known in the art.

A known operator for decomposing an image is referred to in the literature as "Reduce." A representative example of a Reduce operator suitable for the preset embodiments is described in Burt and Adelson, 1983, "The Laplacian Pyramid as a Compact Image Code," IEEE Transactions On Communications, vol. Com-31, No. 4, the contents of which are hereby incorporated by reference. When a Reduce operator is employed, the k+1 element of the set can be calculated based on the kth element, as follows $I^{k+1}$=Reduce($I^k$). In some embodiments of the present invention the set of scaled images form an "Image Pyramid Representation" which is formed by successively applying a downsampling filter having a weighting function centered on the pixel itself. In some embodiments of the present invention the weighting function is a unimodal function, such as a function having a shape which is approximately a Gaussian. When the weighting function approximates a Gaussian, the Image Pyramid Representation is referred to as a Gaussian Pyramid. However, it is not intended to limit the scope of the present embodiments to unimodal or Gaussian weighting function. Other types of weighting function, such as, but not limited to, a triangular weighting function and a trimodal weighting function, are not excluded from the scope of the present invention.

In some embodiments of the present invention a scaled image is obtained by downsampling an image of a finer resolution. Thus, denoting the intensities of the kth scaled image by $I^k$ (x, y), where the set of tuples (x, y) represents the picture-elements in the image, the intensities of the k+1 scaled image can be written as $I^{k+1}$(x, y)=$I^k$($\rho_{DS}$x, $\rho_{DS}$y), where $\rho_{DS}$ is a predetermined downsampling coefficient, and where $I^1$(x, y) can be, for example, the original image, denoted $I_{in}$(x,y). In some embodiments, the decomposing is done by integrating the image $I_{in}$(x,y) with a kernel function, using a different spatial support for each resolution. A representative example of a kernel function for the kth scaled image is a Gaussian kernel, $$\frac{1}{\sqrt{\pi}\,\rho_k}\exp\left(-\frac{x^2+y^2}{(\rho^k)^2}\right),$$

where ρ is a predetermined parameter.

In some embodiments, the decomposing employs an edge-preserving smoothing filter, such as, but not limited to, a bilateral edge-preserving smoothing filter. A bilateral is a non-linear filter introduced by Tomasi and Manduchi (see "Bilateral filtering for gray and color images," Proc. IEE Intl. Conf. on Computer Vision, Bombay, India, 1998), which is used for selective de-noising an images without blurring its edge. The bilateral filter takes into consideration both geometric distances in the spatial domain and similarities in the intensity domain. A bilateral filter typically features a convolution mask having weights which are modified as a function of intensity differences between a picture-element under consideration and its neighbors.

Denoting the edge-preserving smoothing filter by EPF, the kth scaled image of the present embodiments can have the form EPF($I^{k-1}$). A representative example of a edge-preserving smoothing filter suitable for the present embodiments is found, for example, in U.S. Pat. Nos. 5,771,318, 7,146,059 and 7,199,793 the contents of which are hereby incorporated by reference.

As a representative example, which is not intended to be considered as limiting, the following expression can be used as a bilateral filter:

$$EPF(I(\vec{r})) = \frac{\int\int_{image} G_r(|\vec{r}-\vec{r}'|)G_s(|I(\vec{r}')-I(\vec{r})|)I(\vec{r}')d^2\vec{r}'}{\int\int_{image} G_r(|\vec{r}-\vec{r}'|)G_s(|I(\vec{r}')-I(\vec{r})|)d^2\vec{r}'} \quad (EQ.\ 1)$$

where the vectors $\vec{r}$ and $\vec{r}'$ represent the coordinates of the picture-elements in the image, for example, when the image is defined over a Cartesian coordinate system, $\vec{r}$=(x, y) and $\vec{r}'$=(x', y'); $G_r$ and $G_s$ are localized functions with finite supports; and the integration measure $d^2\vec{r}'$ includes a Jacobian which corresponds to the coordinate system over which the image is defined, for example, for a Cartesian coordinate system $d^2\vec{r}'$=dx'dy'. While some of the embodiments below are described, for clarity of presentation, by means of a Cartesian coordinate system, it is to be understood that more detailed reference to a Cartesian coordinate system is not to be interpreted as limiting the scope of the invention in any way. Notice that EQ. 1 features localized functions both in the spatial domain and in the intensity domain. Specifically, the function $G_r$ is centered at the coordinate $\vec{r}$ and the function $G_s$ is centered at the intensity I($\vec{r}$) that is associate with the coordinate $\vec{r}$.

The localized functions $G_r$ and $G_s$ can have any form provided it has a finite support. Representative examples including, without limitation, Gaussians, Lorenzians, modified Bessel functions. In some embodiments of the present invention both $G_r$ and $G_s$ are Gaussians, e.g., $$G_s(|r|)=\exp(-r^2\sigma_s^2);\ (G_r(r)=\exp(-r^2/\sigma_r^2),\quad (EQ.\ 2)$$

where $\sigma_s$ and $\sigma_r$ are radius parameters characterizing the local support of $G_s$ and $G_r$, respectively.

The decomposition 12 preferably features a set of image-specific filters, wherein for each scaled image an image-specific filter with different image-specific parameters is employed. For example, when EQs. 1 and 2 are employed, each scaled image is associated with a different set of radius parameters. The radius parameters used for obtaining the kth image $I^k$ are denoted $\sigma_r^k$ and $\sigma_s^k$. Thus, the kth image t is preferably calculated using the expression $I^k$=EPF($I^{k-1}$), wherein EPF features two localized functions $G_r$ and $G_s$ with two respective image-specific radius parameters $\sigma_r^k$ and $\sigma_s^k$.

The method optionally and preferably continues to 13 at which each of at least some of the scaled images is processed using an adaptation procedure featuring an image-specific effective saturation function.

The effective saturation function is "image-specific" in the sense that for each scaled image the procedures defined a specific effective saturation function which is typically different from the effective saturation function defined for any other scaled image in the set. In various exemplary embodiments of the invention the effective saturation function is applied for each picture-element of the scaled image being processed and can therefore be viewed as a processed scaled image. In other words, the returned values of the effective saturation function can be used as image intensities. The effective saturation function for the kth scaled image $I^k$(x,y) is denoted $R^k$(x,y), and is interchangeable referred to herein as the kth processed scaled image.

$R^k$ is optionally and preferably a function of intensities in kth image as well of intensities in at least one scaled image of the set which is other than the kth scaled image. In various exemplary embodiments of the invention $R^k$ is a function of intensities in at least the kth image and an image which is a blurred version (e.g., with a coarser resolution) of the kth image. For example, $R^k$ can be a function of the $I^k$ and $I^{k+1}$. A typical expression for $R^k$ is (for clarity of presentation, the spatial dependence of $R^k$, $I^k$ and $I^{k+1}$ on the location (x, y) of the picture-element has been omitted):

$$R^k = \frac{R_{max} I^k}{\alpha I^k + \beta I^{k+1}} \quad \text{(EQ. 3)}$$

where, $R_{max}$, $\alpha$ and $\beta$ are coefficients, which can be constants or they can vary across the image and/or between images. For example, $R_{max}$, $\alpha$ and $\beta$ can each be set to 1, but other values are not excluded from the scope of the present invention.

In some embodiments, $R^k$ is a function of a relative luminance $q^k$ between the kth scaled image and the other scaled image (e.g., the k+1 scaled image). In various exemplary embodiments of the invention $q^k$ is the relative luminance per picture-element, namely it has a specific value for each picture-element in the kth scaled image. In these embodiments, $q^k = q^k(x,y)$, where the set of tuples (x, y) represents the picture-elements in the kth image. The relative luminance $q^k(x,y)$ can optionally and preferably be expressed in terms of the ratio between intensities in the kth scaled image and intensities in the other scaled image. For example, $q^k(x,y)$ can be defined as $q^k(x,y) = f(I^k(x,y)/I^{k+1}(x,y))$, where f is some function, preferably a monotonically increasing function, e.g., a linear function characterized by a positive slope. Thus, in some embodiments of the present invention $q^k(x,y)$ is defined as $aI^k(x,y)/I^{k+1}(x,y)+b$, where a and b are parameters which are optionally constants. In some embodiments, a=1 and b=0, but other values are not excluded from the scope of the present invention.

The calculation of the relative luminance $q^k$ optionally and preferably comprises some interpolation of the picture-elements in the coarser image as known in the art. For example $q^k$ can be calculated as $f(I^k(x,y)/\text{Expand}(I^{k+1}(x,y)))$, where Expand is an interpolation operator that preferably matches the number of elements in $I^{k+1}$ with the number of elements in $I^k$ using an interpolation algorithm. In some embodiments of the present invention Expand is the reverse operator of the Reduce operator. A representative example of an Expand operator suitable for the present embodiments is described in Burt and Adelson, supra.

A typical form of $R^k$ when expressed as a function of the relative luminance $q^k$ is (for clarity of presentation, the spatial dependence of $q^k$ and $R^k$ has been omitted):

$$R^k(q^k) = \frac{R_{max}}{\alpha + (M/q^k)^\gamma} + B \quad \text{(EQ. 4)}$$

where $R_{max}$ and $\alpha$ are parameters already introduced above, M and $\gamma$ are a modulation coefficient and an exponent, respectively, and B is an offset parameter. Each of M, $\gamma$ and B can be a constant or some function of the intensity. In the simplest case, $\alpha$, M and $\gamma$ are set to 1, and B is set to zero, so that $R^k$ is reduced to the form $R^k = R_{max}/(a+(q^k)^{-1})$. However, this need not necessarily be the case, since, for some applications, it may be desired to let $\gamma$ and/or M and/or B be different from the above values and/or vary. Higher values of $\gamma$ cause enhancement of the rate of change in R as a function of q, particularly at the vicinity of q=1, where there are small differences between the luminance of a specific location and its context.

Figure 2A:
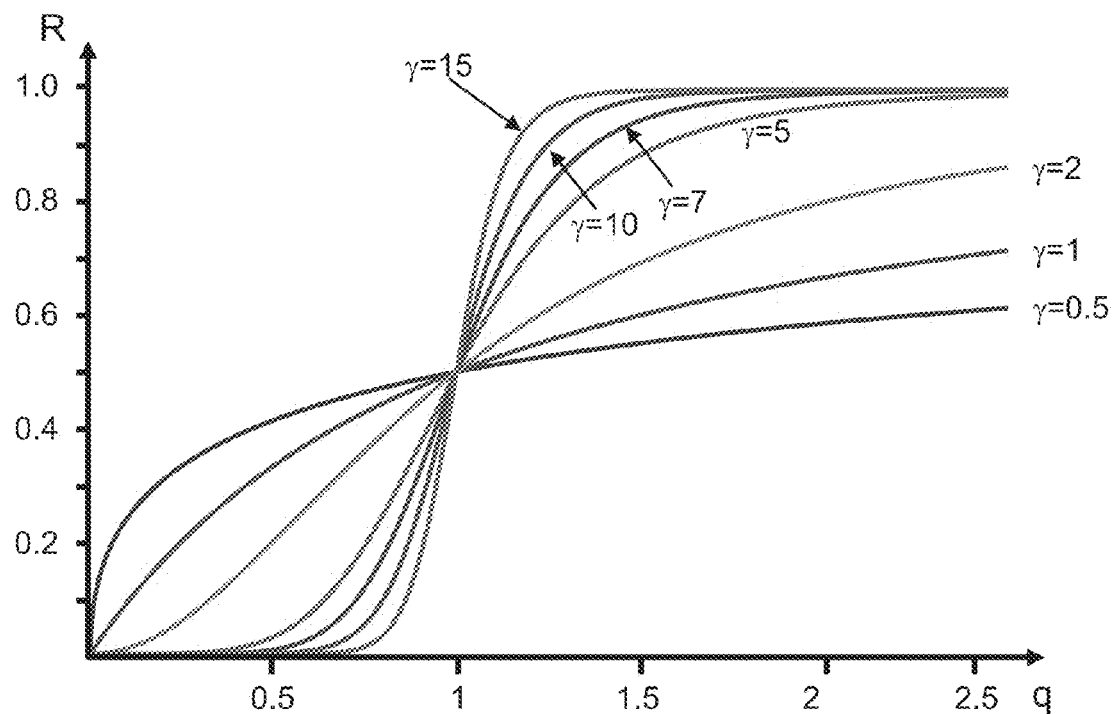

The effect of the exponent $\gamma$ on $R^k$ is exemplified in FIG. 2A, which are plots of $R^k$ as a function of $q^k$, for Rmax=M=1, B=0 and seven fixed values of $\gamma$: $\gamma=0.5$, $\gamma=1$, $\gamma=2$, $\gamma=5$, $\gamma=7$, $\gamma=10$ and $\gamma=15$. It is to be understood that these values are for illustrative purpose only and are not to be considered as limiting.

In some embodiments, the value of $\gamma$ is specific to the scaled image. In these embodiments, the exponent used for the kth scaled image is denoted $\gamma^k$. In some embodiments of the present invention $\gamma^k$ is a decreasing function, e.g., a linear decreasing function, of k. Preferably, $\gamma^k$ is positive for all values of k.

In some embodiments, for the coarse scales (high k) that reflect the illumination $\gamma^k$ can be less than 1 so as to compress the high dynamic range of the illumination; at finer scales (low k) $\gamma^k$ can be set to a value which is higher than 1. Alternatively, $\gamma^k$ is above 1 for all resolution. In some embodiments, $\gamma^k$ satisfies $\gamma_{min} \leq \gamma^k \leq \gamma_{max}$, where $\gamma_{min}$ and $\gamma_{max}$ are predetermined parameters which are the same for all scales. In some specific embodiments of the present invention $\gamma_{min}$ is from about 1 to about 3, e.g., about 2 and $\gamma_{max}$ is from about 5 to about 9, e.g., about 7.

As a representative and non limiting example for a linear decrease of $\gamma$ as a function of the resolution index k, $\gamma$ can be decreased by $\Delta\gamma$ for each integer increment of k, where $\Delta\gamma$ is from about 0.1 to about 0.4 or from about 0.2 to about 0.3, e.g., about 0.25.

Figure 2B:
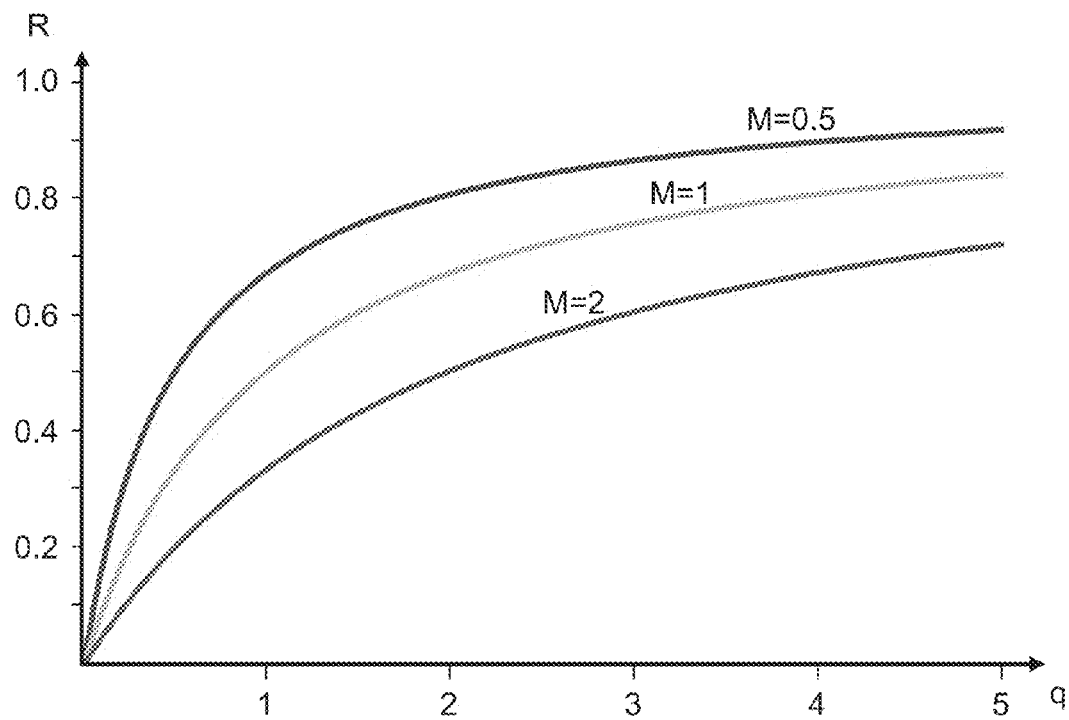

The modulation coefficient M can be viewed as a parameter which modulates the relative luminance $q^k$. Formally, the expression $q^k/M$ can be defined as an effective relative luminance, wherein higher values of M correspond to lower effective relative luminance and lower values of M correspond to higher effective relative luminance. The effect of the modulation coefficient M on $R^k$ is exemplified in FIG. 2B, which are plots of $R^k$ as a function of $q^k$, for $R_{max}=\gamma=1$ and three fixed values of M: M=0.5, M=1 and M=2. It is to be understood that these values are for illustrative purpose only and are not to be considered as limiting. Generally, larger values of M suppress the value of $R^k$. M can be a global constant or it can vary over the picture-elements of the scaled image being processed and/or across the scaled images in the set. When M varies over the picture-elements it is realized as a function of the coordinates, for example, M=M(x,y), and when M varies across the scaled images of the set, the method features a set $\{M^k\}$ of coefficients each of which can be a constant coefficient or a function, e.g., $M^k = M^k(x,y)$.

While the embodiments above are described with a particular emphasis to an effective relative luminance having the form expression $q^k/M$, it is to be understood that more detailed reference to such expression is not to be interpreted as limiting the scope of the invention in any way. Generally, an effective relative luminance $\hat{q}^k$ can be obtained using any linear or non-linear modulation operation, in which case the effective saturation function can be written as:

$$R^k(q^k) = \frac{R_{max}}{\alpha + (\hat{q}^k)^{-\gamma}} + B \quad \text{(EQ. 4A)}$$

In some embodiments of the present invention the value of the exponent $\gamma$ and/or coefficient M is calculated based on image intensities in the scaled image.

For example, the image-specific exponent $\gamma^k$ can be a function of a local contrast $C^k$ within the scaled image $I^k$. Preferably, $\gamma^k$ decreases with $C^k$. In some embodiments, $\gamma^k$ decreases linearly with $C^k$, and in some embodiments $\gamma^k$ decreases non-linearly with $C^k$. A preferred relation between $\gamma^k$ and $C^k$ is:

$$\gamma^k = f(C_{max}) - C^k,\qquad\text{(EQ. 5)}$$

where $C_{max}$ is a constant parameter which, in some embodiments, is the maximal contrast over image $I^k$, and f is some function. Representative examples of expressions suitable for the function $f(C_{max})$ including, without limitation, $f(C_{max})=C_{max}$, and $f(C_{max})=pC_{max}$, where p is a constant parameter which is preferably larger than 1.

An alternative expression for a linear relation between $\gamma^k$ and $C^k$ is:

$$\gamma^k = \delta(1-C^k)\qquad\text{(EQ. 5A)}$$

where $\delta$ is a contrast enhancement parameter. Typically, larger values of $\delta$ correspond to higher characteristic contrast of the final image.

Also contemplated is a non-linear relation between $\gamma^k$ and $C^k$, for example, $$\gamma^k = N/(C^k)^n,\qquad\text{(EQ. 6)}$$

where N and n are positive constants, e.g., N=n=1.

The modulation operation executed for providing the effective relative luminance $\hat{q}^k$ (for example, the value of M, in embodiments in which $\hat{q}^k=q^k/M$) is optionally and preferably selected such that the returned values of the effective saturation functions for two different exponents be approximately equal for a given scale. For example, consider the kth the effective saturation function $R^k$. This function can be calculated more than once, using a different value for the exponent $\gamma^k$ at each calculation. Without loss of generality, suppose that for a given scale k, two saturation functions $R_0^k$ and $R_1^k$ are calculated, as follows:

$$R_0^k(q^k) = \frac{R_{max}}{\alpha + (M/q^k)^{\gamma_0^k}} + B;$$

$$R_1^k(q^k) = \frac{R_{max}}{\alpha + (M/q^k)^{\gamma_1^k}} + B.$$

The exponents $\gamma_0^k$ can have a fixed and predetermined (e.g., the same value for $\gamma_0^k$ for all values of k), and $\gamma_1^k$ can be selected according to the local contrast as further detailed hereinabove. In various exemplary embodiments of the invention $\gamma_0^k$ is the lowest allowed value of the exponent, e.g., $\gamma_0^k=\gamma_{min}$. In some embodiments of the present invention the effective relative luminance $\hat{q}^k$ is selected such that $R_0^k(\hat{q}^k)=R_1^k(q^k)$.

The local contrast $C^k$ can be calculated from the intensity values of the picture-element in the respective scaled image using any known procedure for detecting or calculating local contrast. Representative techniques suitable for the present embodiments are found, for example, in U.S. Pat. Nos. 7,791,652, 7,929,739, 6,078,686 and 5,838,835 the contents of which are hereby incorporated by reference.

In some embodiments of the present invention the local contrast is calculated based on one or more intensity differences between scaled images in the set. Typically, the local contrast is calculated based on intensity differences between scaled images whose resolution is not lower than the resolution of the currently processed scaled image. A representative example for the local contrast $C^k$ in these embodiments is:

$$C^k = \sum_{i=0}^{k} |I^i - I^{i+1}|^\epsilon,\qquad\text{(EQ. 6A)}$$

where $\epsilon$ is a local contrast exponent. Typical values for $\epsilon$ are from about 0.1 to about 1, e.g., about 0.3.

In some embodiments of the present invention the local contrast is calculated using a contrast-based adaptation procedure which can be constructed so as to mimic a mechanism of the human vision system known as a second order achromatic induction. The contrast-based adaptation procedure of the present embodiments is preferably as follows.

Firstly, the procedure mimics the transformation of a visual stimulus into a response of post retinal second order opponent receptive fields (SORF's). These SORF's may refer to cortical levels even though the receptive fields are not necessarily oriented. These SORF's have various spatial resolutions, in compliance with the diversity found in the human visual system. The number of different spatial resolutions employed by the procedure and the number of scaled images in the set can be the same or they can be different. In some embodiments of the present invention the number of different spatial resolutions employed by the contrast-based procedure is larger than the number of scaled images in the set.

Secondly, local and remote contrasts are calculated based on the multi scale SORF responses, and thirdly a contrast-contrast induction is employed. The contrast-contrast induction serves as a contrast gain control and is expressed by the adapted responses of the SORF cells.

In the human visual system, the SORF cells receive their input from the retinal ganglion cells through several processing layers. The retinal ganglion cells perform a (first order) adaptation and the SORF cells receive their responses after the adaptation. In the following description, the first order adaptation is not modeled for clarity of presentation, but the skilled artisan, provided with the information described herein would know how to employ first order adaptation, e.g., using the formalism of center and surround adaptation terms described above and/or the first order adaptation described in Barkan et al., (2008), "Computational adaptation model and its predictions for color induction of first and second orders,", J. of vision 8(7) 27 1-26.

The SORF cells have an opponent type receptive field with a center-surround spatial structure. Thus, in various exemplary embodiments of the invention the method defines, for each picture-element 20 one or more regions in the vicinity of picture-element 20 (but not necessarily adjacent thereto). Typically, a surrounding region is defined. In some embodiments the method also defines a center region which comprises element 20 and picture elements immediately adjacent to element 20. Alternatively, the center region may be a single element region, hence comprising only element 20. This alternative, of course, coincide with the embodiment in which no center region is selected.

Figures 3A, 3B:
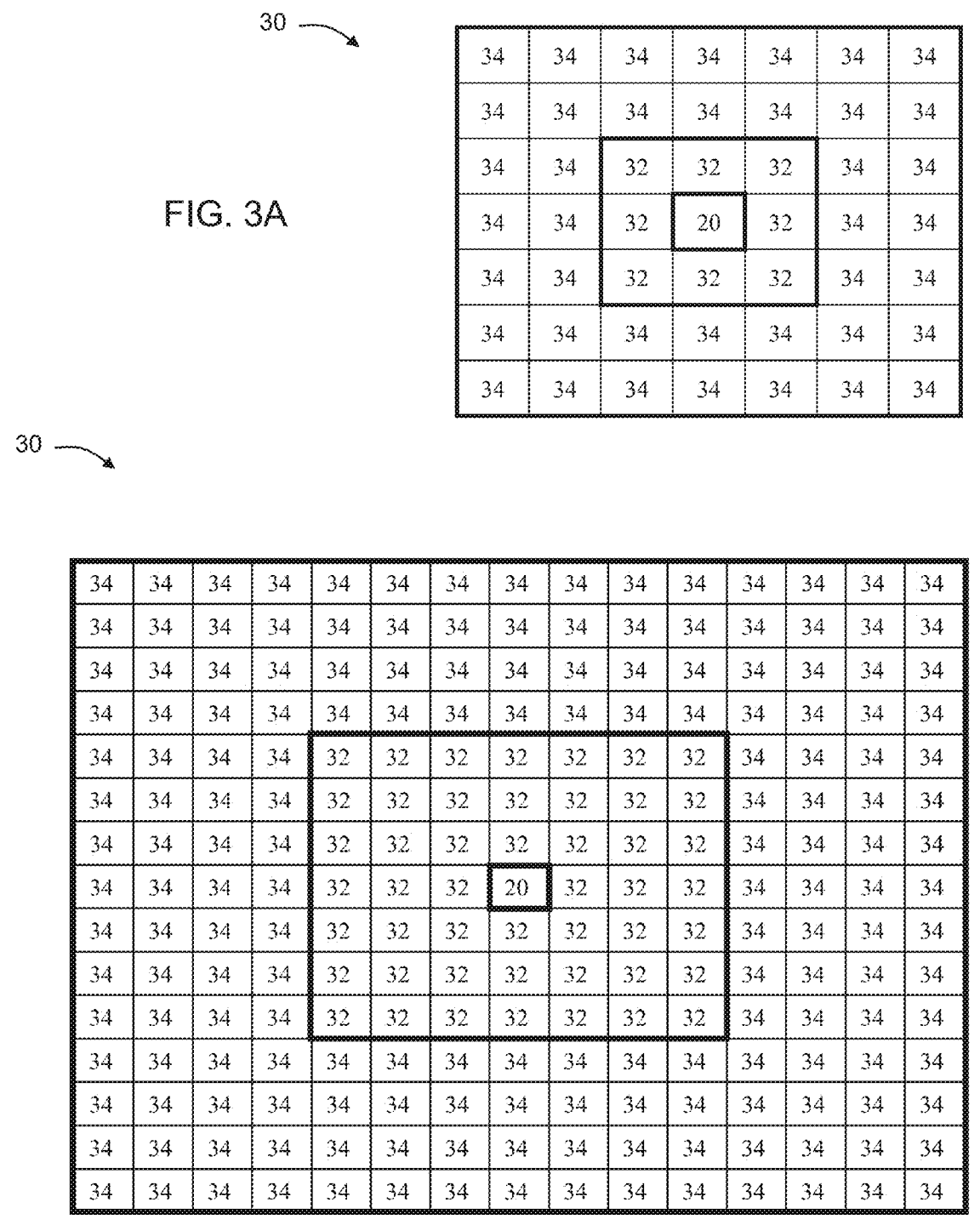

The concept of the center and surrounding regions may be better understood from the following example, with reference to FIGS. 3A-B. Thus, if the picture elements are arranged in a rectangular grid 30, the center region may be a single picture element (element 20), and the surround region may be picture elements 32 surrounding picture elements 20. Picture elements 34, surrounding picture elements 32 can be referred to as remote region.

In FIG. 3A, the surround region comprises eight picture-elements immediately surrounding (i.e., adjacent to) element 20, and the remote region comprises 40 picture-element forming the two layers surrounding those eight picture-elements. However, this need not necessarily be the case, since, for some applications, it may be desired to extend the surround region farther from those eight elements which immediately surround element 20. FIG. 3B, for example, illustrates an embodiment in which the surround region comprises 48 picture-element which form the first three layers surrounding element 20, and the remote region comprises 176 picture-element which form the four layers surrounding those 48 elements. Also contemplated are embodiments in which the center region comprises more picture-element, e.g., an arrangement of 2×2 or 3×3 picture-elements. Other definitions for the center, surrounding and remote regions are not excluded from the present invention, both for a rectangular grid or for any other arrangement according to which the picture elements of the scaled image are received.

Once the region(s) are defined, the intensities of the picture elements in each region are preferably used for calculating, for each region, an overall regional intensity. The overall intensity can be calculated as a convolution of the intensity of the picture elements in each region with the respective regional spatial profile. For the center region, this convolution is preferably realized by the following equations:

$$L_{cen}^k = \int\int_{cen} I^k(x, y) f_c^k(x - x_0, y - y_0) dx dy \qquad (EQ. 7)$$

where $(x_0, y_0)$ is the location of the center of the center region, $f_c^k$ is the spatial profile for the center region at the kth scaled image, and the integration is over all the picture-elements in the center region. Without loss of generality, $(x_0, y_0)$ can be set to $(0, 0)$. In the following description, the reference to $x_0$ and $y_0$ is therefore omitted. The center spatial profile is preferably a spatial decaying function. Examples for the specific form of the spatial profile of the center region include, but are not limited to, a Gaussian, an exponent, a Lorenzian, a modified Bessel function and a power-decaying function.

In some embodiments of the present invention, $f_c^k$ is given by:

$$f_c^k(x, y) = \frac{\exp(-x^2 + y^2 / \rho_{cen}^{k2})}{\pi \cdot \rho_{cen}^k}; x, y \in \text{center\_area} \qquad (EQ. 8)$$

where $\rho_{cen}$ represents the radius of the center region.

For the surround region, the convolution is similarly defined:

$$L_{srnd}^k = \int\int_{srnd} I^k(x, y) f_s^k(x, y) dx dy \qquad (EQ. 9)$$

where $f_s^k$ is the spatial profile for the surround region at the kth scaled image, and the integration is over all the picture-elements in the surround region. Examples for the specific form of the spatial profile of the surround region include, but are not limited to, a Gaussian, an exponent, a Lorenzian, a modified Bessel function and a power-decaying function.

In some embodiments of the present invention, $f_s^k$ is given by:

$$f_s^k(x, y) = \frac{\exp(-x^2 + y^2 / \rho_{sur}^{k2})}{\pi \cdot \rho_{sur}^k}; x, y \in \text{surround\_area} \qquad (EQ. 10)$$

where $\rho_{sur}$ (also referred to below as $\rho_{sur}$) represents the radius of the surrounding region. The total weight of $f_c$ and $f_s$ is typically 1.

The response of the SORF $L_{sorf}$ can be calculated based on the difference between the intensity value of picture-element(s) in the center region and intensity values of nearby picture-elements in the surround region. For example, $$L_{sorf}^k = L_{cen}^K - L_{srnd}^k \qquad (EQ. 11)$$

The calculations of the SORF response can be alternatively derived from an achromatic double-opponent receptive field structure, where the center and the surrounding regions contained opponent sub-units described for example, in Barkan et al. 2008, supra.

$L_{sorf}^k$ is optionally and preferably used for calculating a contrast term, for example, by averaging the value of $L_{sorf}^k$ over several scaled images or, more preferably, over all the scaled images in the set. A representative examples for the contrast C is given by:

$$C^k(x, y) = \sum_{k'} \frac{\int\int |L_{sorf}^{k'}(x', y')|^\delta W^{k'}(x' - x, y' - y) dx dy}{\int\int W^{k'}(x, y) dx dy} \qquad (EQ. 12)$$

where the integrations are preferably over a region encompassing the scales that are defined in the contrast region, $\delta$ is a parameter, and $W^k(x,y)$ are weight functions which are preferably localized at $(x,y)$, with some predetermined support. The $\delta$ can be any integer or non-integer positive number. Typically, the $\delta$ parameter satisfies $\delta \geq 1$, e.g., $\delta=1$ or $\delta=2$ or $\delta=3$. A representative example of $W^k(x,y)$ is a two-dimensional Gaussian:

$$W^k(x, y) = \exp\left(-\frac{x^2 + y^2}{\rho_{local}^2}\right), \qquad (EQ. 13)$$

where $\rho_{local}$ is a radius parameter representing the size of the support.

Once calculated, $C^k$ can be used for calculating the exponent $\gamma^k$, by means of a linear or non-linear relation, as further detailed hereinabove.

The above contrast-based procedure can also be used for calculating the modulation coefficient M described above (see EQ. 4). In some embodiments, M is a decreasing function of $L_{sorf}^k$. In other words M has higher values when the local contrast is low, and lower values when the local contrast is high. For example, the coefficient $M^k$ for the kth scaled image can be a linear decreasing function of $L_{sorf}$, e.g., $M=f(I_{max}^k)-L_{sorf}^K$, where $I_{max}^k$ is the maximal intensity over the kth scaled image, and f is some function, e.g., $f(I_{max}^k)=I_{max}^K$ or $f(I_{max}^k)=mI_{max}^K$ where m is a positive parameter. Alternatively, M can be a non-linear decreasing function of $L_{sorf}$. A representative example is the expression $M=1/L_{sorf}^k$ or the like. Other expressions are not excluded from the scope of the present invention.

When EQ. 3 is employed, the contrast-based procedure can be used for calculating the β coefficient. In some embodiments, the β coefficient is a decreasing function of $L^k_{sorf}$. In other words β has higher values when the local contrast is low, and lower values when the local contrast is high. For example, the coefficient $\beta^k$ for the kth scaled image can be a linear decreasing function of $L_{sorf}$, e.g., $\beta^k = f(I^k_{max}) - L^k_{sorf}$, where $I^k_{max}$ is the maximal intensity over the kth scaled image, and f is some function, e.g., $f(I^k_{max}) = I^k_{max}$ or $f(I^k_{max}) = mI^k_{max}$ where m is a positive parameter. Alternatively, M can be a non-linear decreasing function of $L_{sorf}$. A representative example is the expression $\beta^k = 1/L^k_{sorf}$ or the like. Other expressions are not excluded from the scope of the present invention.

Referring again to FIG. 1 the method can continue to 14 at which at least some of the processed scaled images are combined to provide a combined image. The images are preferably combined by multiplication. For example a combined image $I_{combined}$ can be obtained using the following equation:

$$I_{combined} = \prod_k I^k, \quad (EQ. 14)$$

where the multiplication is over some or all the scaled images in the set.

The combined image can also be obtained from the relative luminance of the effective saturation functions, rather than from the effective saturation functions themselves. These embodiments are particularly useful when the relative luminance levels are modulated. For example, the combined image can be obtained by multiplying the effective relative luminance values of at least a few, more preferably, all the effective saturation functions:

$$I_{combined} = \prod_k \hat{q}^k, \quad (EQ. 14A)$$

where the multiplication is over some or all the scaled images in the set.

The calculation of the combined image optionally and preferably comprises some interpolation of the picture-elements in the coarser image as known in the art. For example, the following iterative process can be employed:

$$I^n = \hat{q}^n \hat{q}^{n+1}$$

$$\hat{q}^{n+1} = \text{Expand}(I^{n+1}), \quad (EQ. 14B)$$

where Expand is an interpolation operator as further detailed hereinabove. Once the iterative process (14B) is completed, the combined image can be defined as image obtained at the last iterative step, e.g., $I^0$.

The method optionally continues to 15 at which the combined image is normalized. A normalization procedure suitable for the present embodiments is the so called log-mean normalization, wherein the logarithm of the intensity of each picture-element is first normalized by the average of the logarithms of intensities and then exponentiated. Formally, this procedure can be written as:

$$I_{combined} \rightarrow \exp\left[\log(I_{combined}) \frac{TL}{\langle \log(I_{combined}) \rangle}\right], \quad (EQ. 15)$$

where $\langle \log(I_{combined}) \rangle$ is the average of the logarithms of intensities calculated over the combined image, and TL is a constant parameter which represents the log-mean of the normalized image. The method optionally and preferably proceeds to 16 at which the combined and/or normalized image is transmitted to a computer readable medium, from which it can be displayed or printed as desired.

In various exemplary embodiments of the invention the characteristic dynamic range of the combined and/or normalized image is lower than the characteristic dynamic range of the original image. For example, when the characteristic dynamic range of the original image spans over 4 or more orders of magnitudes, the characteristic dynamic range of the combined image is three or two orders of magnitudes. In various exemplary embodiments of the invention the characteristic dynamic range of the combined image is sufficient to allow all the intensities of the image to be displayed on a display device. For example, in some embodiments of the present invention the combined image comprises no more than 256 different intensities.

The method ends at 17.

Figure 4:
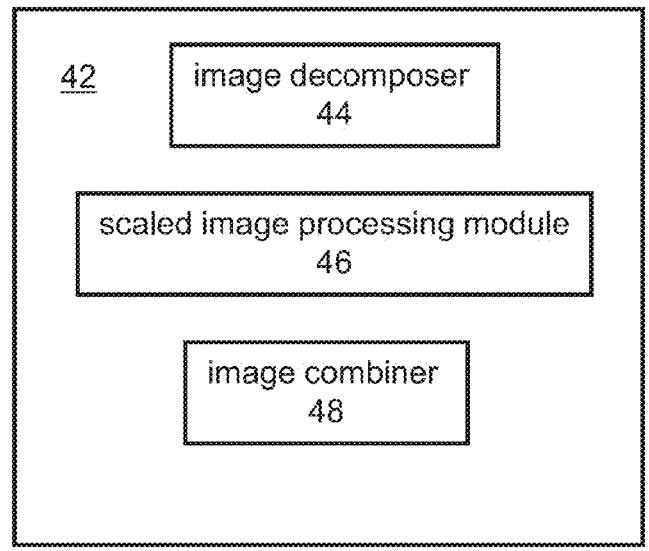

FIG. 4 is a schematic illustration of a system 40 for processing an image, according to some embodiments of the present invention. System 40 comprises a data processor 42 having a computation module which comprises at least an image decomposer 44 configured for decomposing the image into a set of scaled images, a scaled image processing module 46 configured for processing each scaled image of set to provide a processed scaled image, and an image combiner 48 configured for combining at least some of the processed scaled images to provide a combined image. In various exemplary embodiments of the invention the computation module of data processor 42 is configured for executing at least some of the operations described above with respect to method 10-17.

Figure 5:
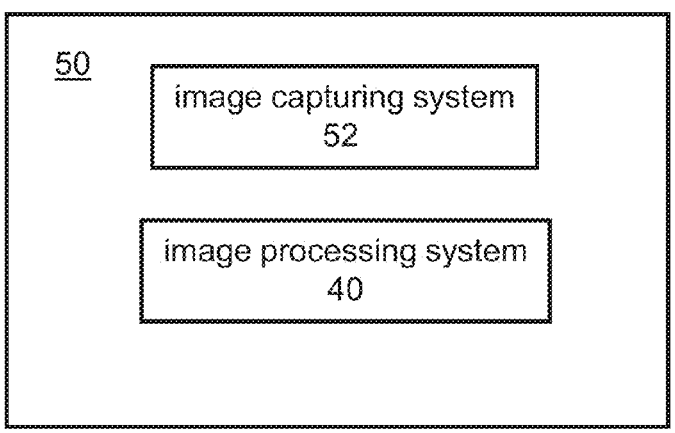
Figure 6A:
Figure 6B:
Figure 7A:
Figure 7B:
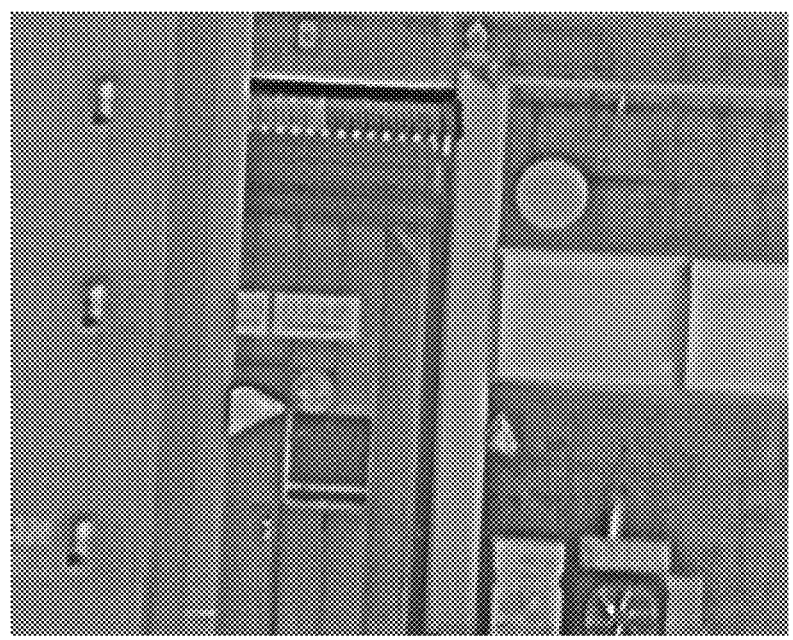
Figure 8A:
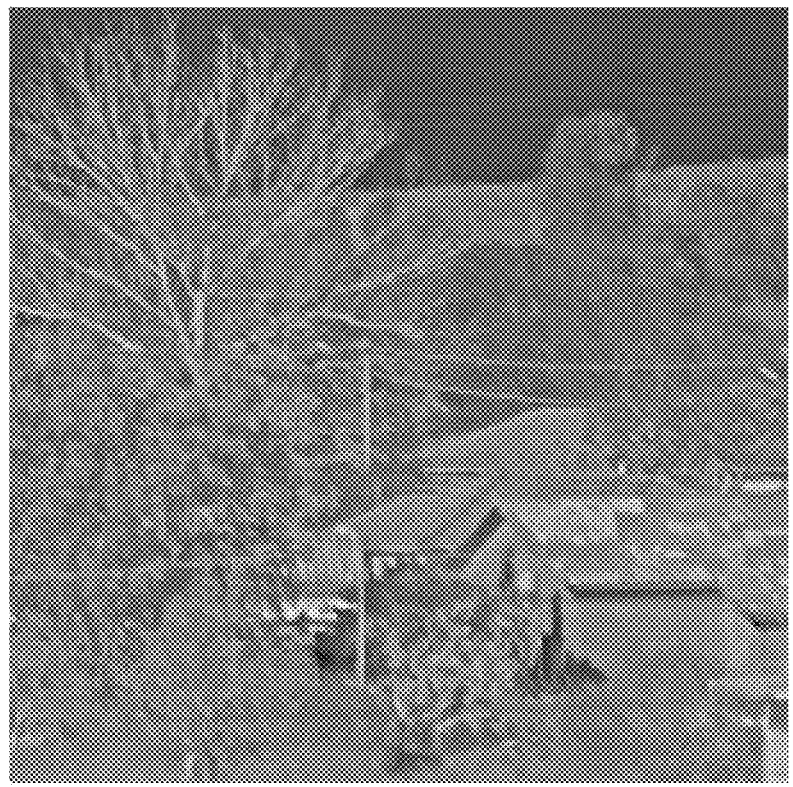
Figure 8B:
Figure 9A:
Figure 9B:
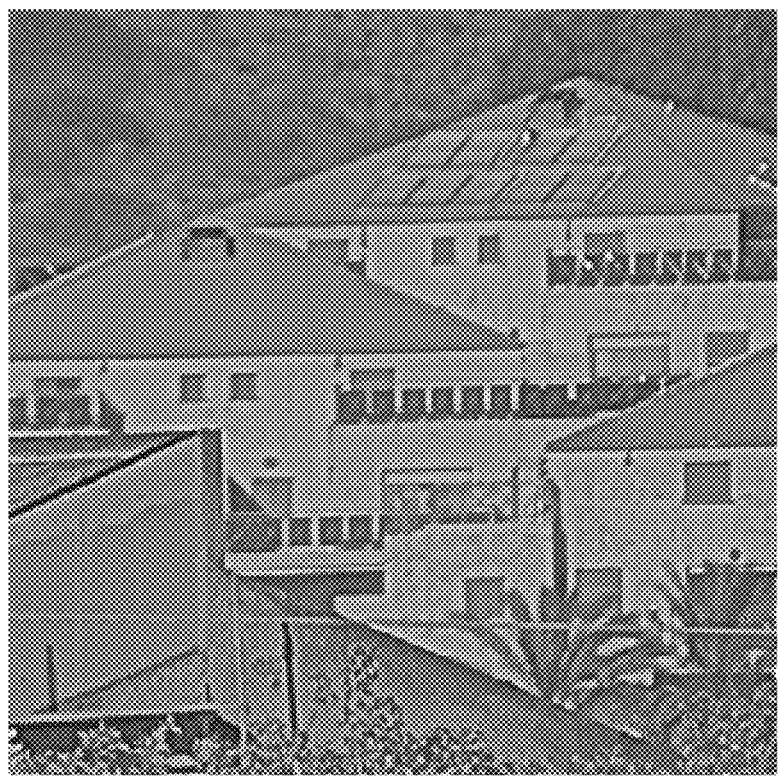
Figure 10A:
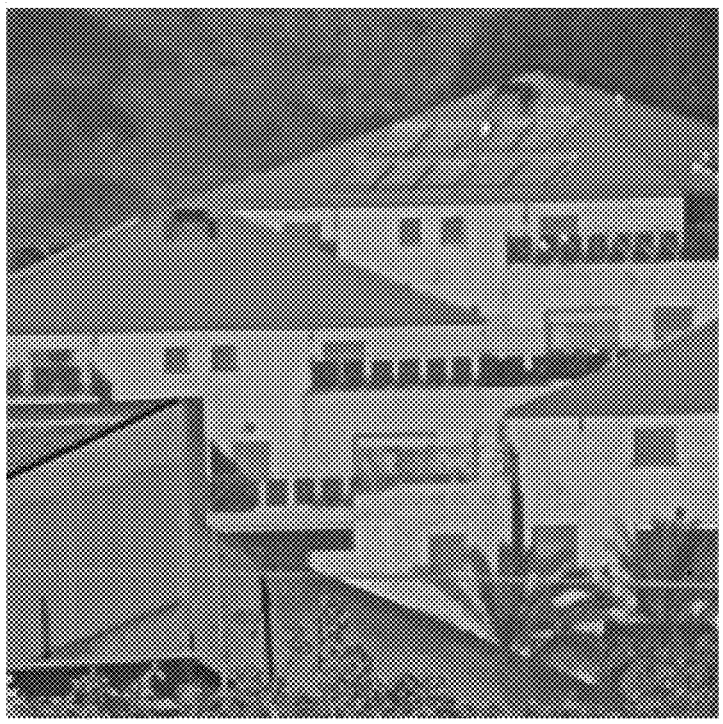
Figure 10B:
Figure 11A:
Figure 11B:
Figure 12A:
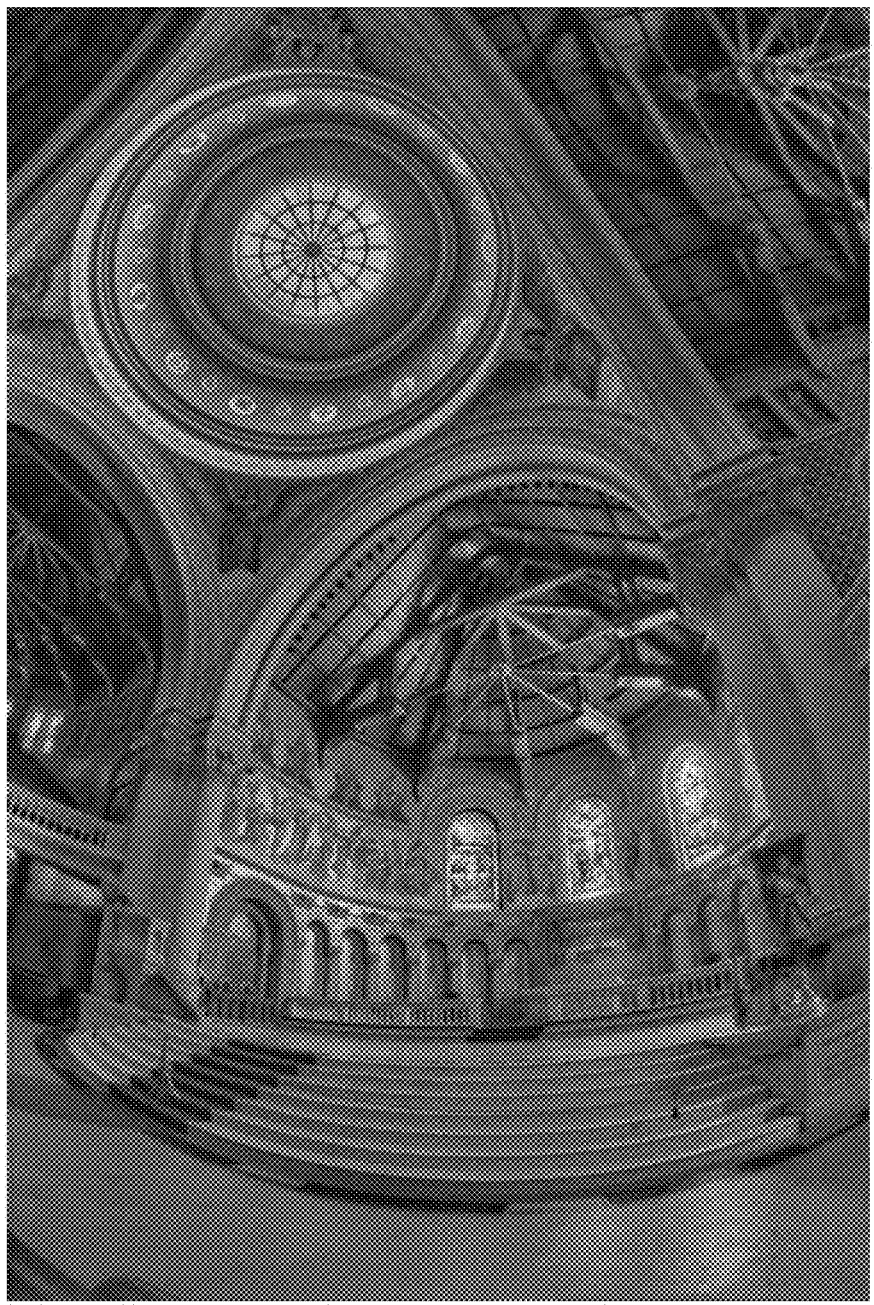
Figure 12B:
Figure 12C:
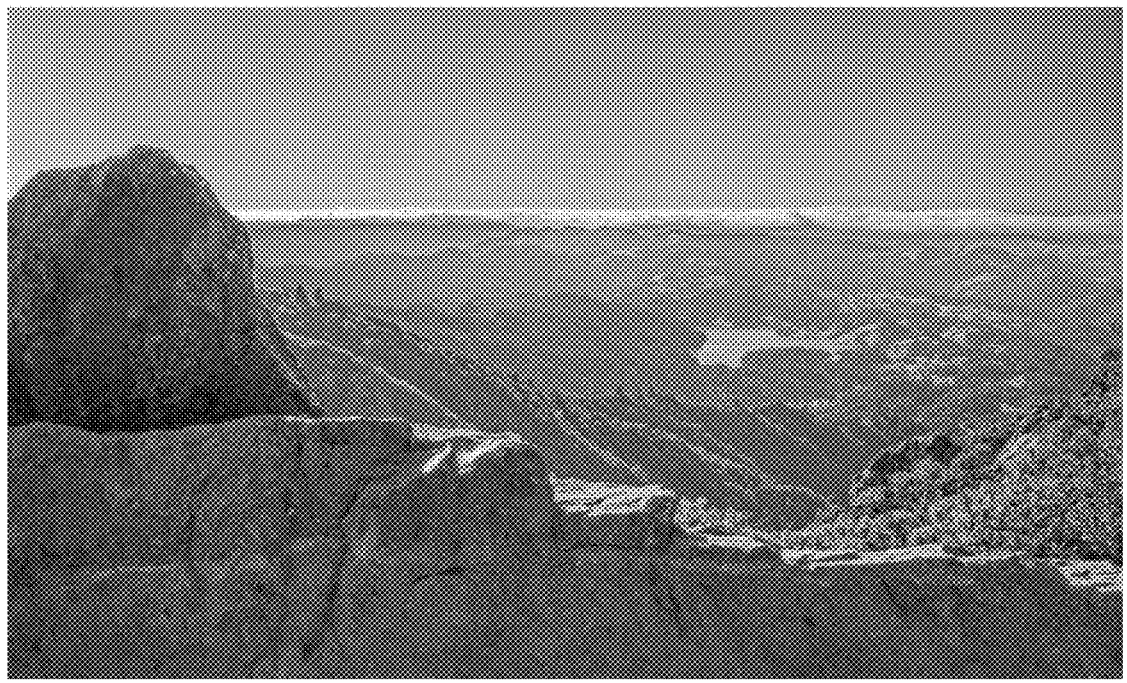
Figure 12D:
Figure 13A:
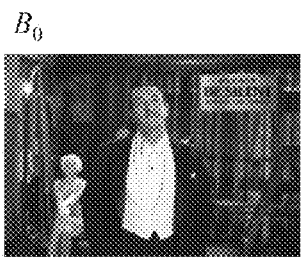
Figure 13B:
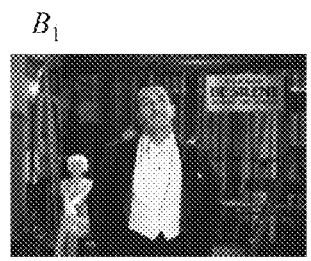
Figure 13C:
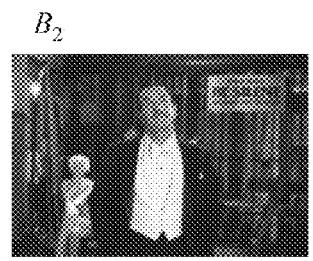
Figure 13D:
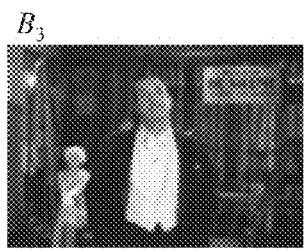
Figure 13E:
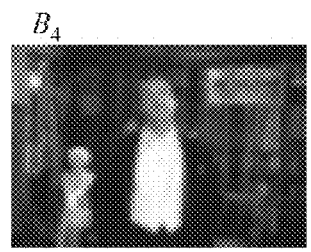
Figure 13F:
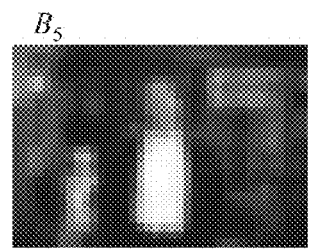
Figure 14A:
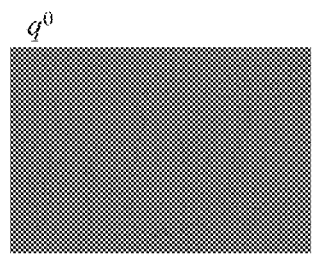
Figure 14B:
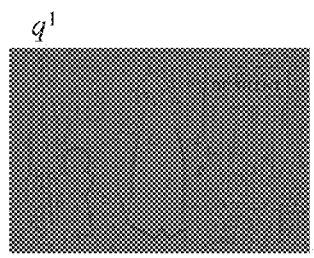
Figure 14C:
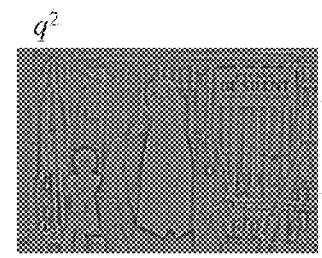
Figure 14D:
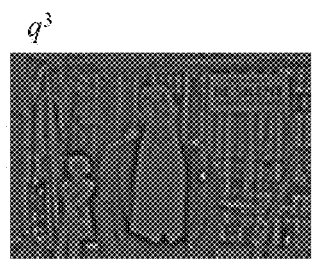
Figure 14E:
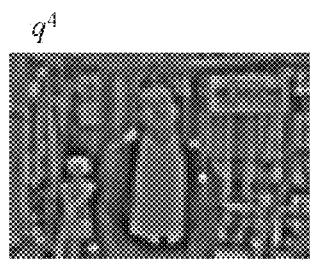
Figure 15A:
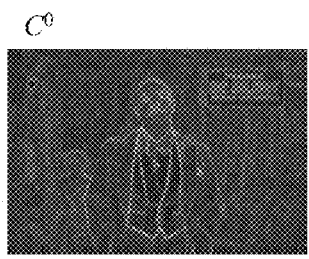
Figure 15B:
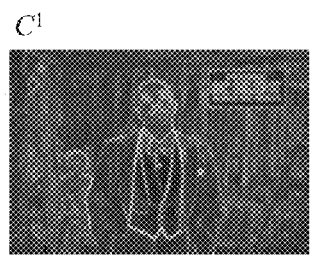
Figure 15C:
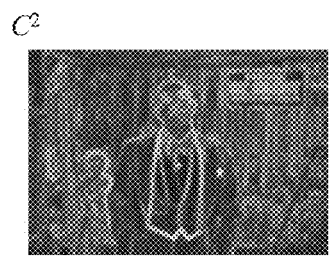
Figure 15D:
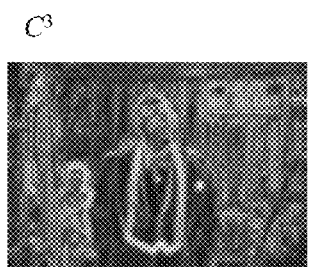
Figure 15E:
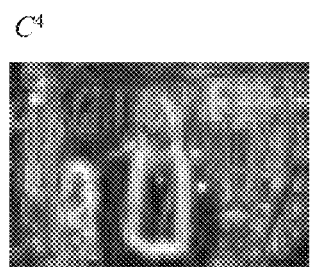
Figure 16A:
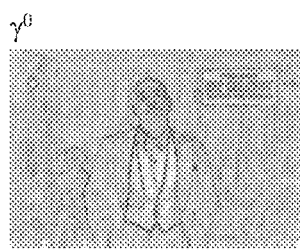
Figure 16B:
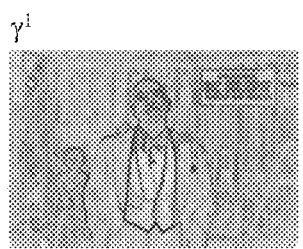
Figure 16C:
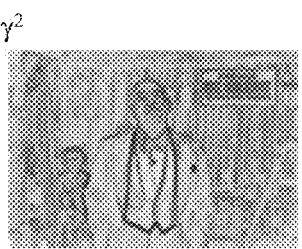
Figure 16D:
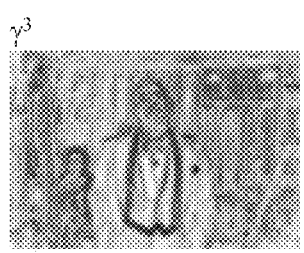
Figure 16E:
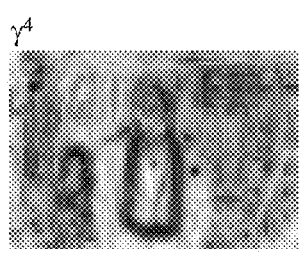
Figure 17A:
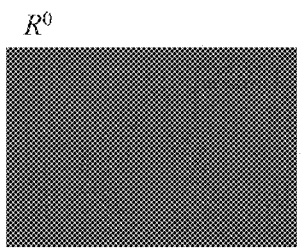
Figure 17B:
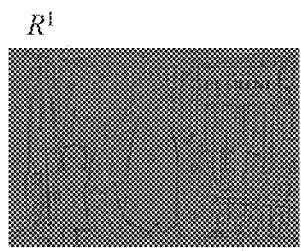
Figure 17C:
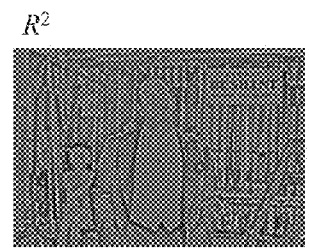
Figure 17D:
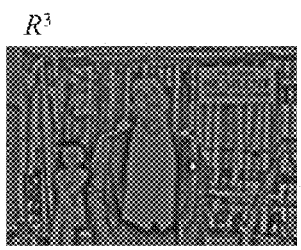
Figure 17E:
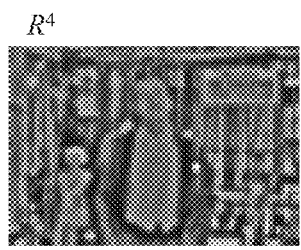

FIG. 5 is a schematic illustration of an imaging system 50, according to some embodiments of the present invention. Imaging system 50 comprises an image capturing system 52 and system 40. Image capturing system 52 can be of any type, including, without limitation, a digital camera, a video camera, a CMOS digital camera, an infrared camera, an X-ray camera, a scanner, a microwave imaging, a computerized tomography scanner, a magnetic resonance imaging scanner, a mammography scanner, an ultrasonic scanner, an impedance imaging system, an endoscopic imaging device, a radio telescope, a digital telescope, a digital microscope and a system for translating an analog image to a digital image.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Thermal Images

The technique of the present embodiments was employed to process thermal images acquired using an infrared camera. FIGS. 6A, 7A, 8A, 9A, 10A and 11A show the original images, before processing. Each image was processed according to some embodiments of the present invention as described in the flowchart of FIG. 1. The image was decomposed into 3 scaled images each of which was processed using EQs. 1, 2, 4, 5 and 7-14. The modulation coefficient was set to 1.

For the contrast-based adaptation procedure, up to six possible resolutions were employed. The application of the specific resolution was done such that the coarse resolution was applied to the overall scales for the whole image. In other word, fine resolution in the SORF were not included in the coarse general scales. Table 1 specifies the radii of the center and surround regions which were used for each resolution k.

TABLE 1

| k | radius of the center region | radius of the surround region |
|---|---|---|
| 1 | 1 | 3 |
| 2 | 3 | 9 |
| 3 | 5 | 15 |
| 4 | 7 | 12 |
| 5 | 9 | 27 |
| 6 | 11 | 33 |

FIGS. 6B, 7B, 8B, 9B, 10B and 11B show the images after processing ad combining. As shown, the technique of the present embodiments allows distinguishing between image features which were undistinguishable before the processing.

Example 2

HDR Images

Embodiments of the present invention were applied to High Dynamic Range images in an RGBE format. The original HDR images were obtained through the courtesy of Michael Werman, Erik Reinhard, Greg Ward, SpheronVR AG, Munsell Color Science Laboratory, and Paul Debevec's website.

Achromatic intensities were extracted from the polychromatic data of the images. This was performed by transforming each pixel in the RGBE image to CIE XYZ using the D65 sRGB transform matrix [IEC 61966-2-1:1999]. The achromatic intensity of each pixel was defined as the Y value of the pixel. Further transformation from the CIE XYZ space to CIE xyz was performed for each pixel, and the x,z, values were applied to the new achromatic intensities yielded according to various exemplary embodiments of the present invention.

Each image was processed according to some embodiments of the present invention as described in the flowchart of FIG. 1. The image was decomposed into 4 scaled images each of which was processed using EQs. 1, 2, 4, 5 and 7-14. The modulation coefficient was set to 1. The parameters used in the contrast-based adaptation procedure were as detailed in Example 1, above.

The dynamic ranges of original images are larger than the maximal displayable dynamic range of a conventional display device or a conventional printer and are therefore not shown. The combined and normalized processed scaled images are shown in FIGS. 12A-D.

The present example demonstrated the ability of embodiments of the present invention to perform automatic high dynamic range compression. The difference between the dynamic ranges of the original and processed image was up to about $10^{10}$ levels of intensity. The results demonstrate a significant compression while preserving, and even slightly enhancing the details in the images, both in the bright and dark zones. The technique has been applied for a large number of images. Although most of the experiments were performed using the same set of parameters, the dynamic compression was successful in all processed images. Yet, the technique of the present embodiments can be applied to different extents by assigning different values to the parameters.

Example 3

Optimization Considerations

A multi-resolution representation of an image I, referred to below as "the artist" image was produced according to some embodiments of the present invention using a Reduce operation featuring Gaussian weights, thereby forming a Gaussian pyramid. The process was applied as follows:

$$B_n = \text{Reduce}(B_{n-1}), \tag{EQ. 16}$$

where the finest resolution $B_0$ was set to be the original image:

$$B_0 = I. \tag{EQ. 17}$$

The obtained Gaussian pyramid for a set of six scaled images $I_0, \ldots, I_5$ is shown in FIGS. 13A-F.

A relative luminance $q^n$ was then calculated according to the relation:

$$q^n = I^n / I^{n+1}, \tag{EQ. 18}$$

where $I^n$ is the nth scaled image and $I^{n+1}$ is an interpolated version of the n+1 scaled image obtained using the Expand operator:

$$I^n = B_n$$

$$I^{n+1} = \text{Expand}(B_{n+1}) \tag{EQ. 19}$$

The calculation of relative luminance resulted in a luminance pyramid corresponding to the relative luminance levels $q^0, \ldots, q^4$, shown in FIGS. 14A-E.

Once the luminance pyramid was obtained, a local contrast $C^k$ was calculated for each luminance level q. The local contrast was calculated according to EQ. 6A above with $\epsilon = 0.3$. This resulted in a local contrast pyramid corresponding to the local contrast levels $C^0, \ldots, C^4$, shown in FIGS. 15A-E.

Each of the local contrast levels $C^0, \ldots, C^4$ was used for calculating a image-specific exponent $\gamma$ according to EQ. 5A, thus providing a set of exponents $\gamma^0, \ldots, \gamma^4$. The corresponding representation pyramid is shown in FIGS. 16A-E. Thereafter, EQ. 4 was employed for calculating an effective saturation function $R^n$ for each luminance level $q^n$, and each exponent $\gamma^n$. This resulted in a saturation pyramid corresponding to the functions $R^0, \ldots, R^4$, shown in FIGS. 17A-E.

The effective luminance levels were then combined according to EQ. 14B, to provide a combined image $I_{combined}$. The original image I and the combined image $I_{combined}$ are shown in FIGS. 18A and 18B respectively.

Multi resolutions algorithms tend to suffer from halo artifacts that appear around sharp edges. The present inventors contemplate both embodiments in which a bilateral filter is used and alternative embodiments in which a bilateral filter is not used. In the latter embodiments, considerations regarding the coarse contrast of the image are preferably made. In various exemplary embodiments of the invention the processing technique applies one or more smoothing filter, such as, but not limited to, Gaussian filter and performs the enhancement adaptively, as further detailed hereinabove. For areas in the image where the contrast is high, the contrast is not enhanced and may even be decreases.

It was found by the present inventors that for images that are relatively dark, the use of global gain may improve the quality of the final image. Thus, in some embodiments of the present invention, a global gain operation is applied in addition to the local contrast enhancement. This can be achieved in any technique known in the art. In some embodiments, all of the image pixels are raised to the same constant power, which is optionally and preferably less than 1:

$$I \rightarrow I^p \tag{EQ. 20}$$

In various exemplary embodiments of the invention the gain exponent p is selected using an optimization procedure. For example, a set $\{p_j\}$ of candidate values of the gain exponent can be selected and a score can be assigned to each candidate gain exponent $p_j$ of the set. The gain exponent is then selected from the candidates responsively to the assigned scores. Typically, the gain exponent is the candidate having the highest score. Formally, denoting the score assigned to the jth candidate gain exponent by $S(I^{p_j})$, the gain exponent can be calculated using the operation:

$$p = \underset{p_j}{\operatorname{argmax}}(S(I^{p_j})) \tag{EQ. 21}$$

A score suitable for the present embodiments is characteristic contrast of at least one of, more preferably at least some of, most preferably all, the scaled images in the set. Such characteristic contrast is referred to herein as a "Contrast Measure".

In some embodiments, the Contrast Measure is a local-global contrast. A representative example of a technique for calculating a local-global contrast suitable for the present embodiments is found in Rizzi et al., "A Modified Algorithm for Perceived Contrast Measure in Digital Images," CGIV 2008 and MCS'08 Final Program and Proceedings, the contents of which are hereby incorporated by reference. For example, the Contrast Measure can be calculated by summing the averages of the pyramid levels.

$$\text{Contrast Measure}(I) = \sum_n \text{Average}(I_n - I_{n-1}) \tag{EQ. 22}$$

The summation in EQ. 22 is optionally and preferably performed over all the elements in the set. EQ. 22 ensures that an image with high contrast yields higher values for the contrast measure, wherein an image with low contrast yields lower values for the contrast measure.

When the score S is enacted by the function Contrast Measure, EQ. 22 is applied for each candidate $p_j$, and the gain exponent p is preferably selected using the operation:

$$p = \underset{p_j}{\operatorname{argmax}}(\text{Contrast Measure}(I^{p_j})). \tag{EQ. 23}$$

The size of the set (namely, the number of scaled images in the set which is the number of different resolutions employed) can be selected by the size of the image or by the amount of information in the image.

When the size of the set is selected based on the size of the image, it is optionally and preferably selected such that the coarsest resolution is of a predetermined size, for example a 64×64 resolution or a 32×32 resolution or a 16×16 resolution. Selecting the size of the set base on the size of the image is particularly useful when a relatively small portion of the input image is occupied by background.

When the size of the set is selected based on the amount of information in the image, the size of the set is preferably determined during the buildup of the set. In these embodiments, the amount of information that is being added by each resolution is determined. Once the amount of added information is below a predetermined threshold, the set buildup is terminated. The amount of added information can be calculated, for example, by counting the number of identifiable features (e.g., edges, distinguishable regions) in each scaled image. Selecting the size of the set base on the size of the image is particularly useful when a relatively large portion of the input image is occupied by background, and is generally preferred from the standpoint of computer resources.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of processing an image, comprising:
   obtaining an image decomposed into a set of scaled images, each being characterized by a different image-scale;
   for each of at least some scaled image of said set, calculating a relative luminance between said scaled image and another scaled image of said set, using intensities in said scaled image and intensities in said another scaled image;
   processing each scaled image of said set using an adaptation procedure featuring an image-specific effective saturation function of said relative luminance, thereby providing a processed scaled image;
   combining at least some of the processed scaled images to provide a combined image; and
   outputting said combined image to a non-transitory computer readable medium.

2. The method of claim 1, wherein said obtaining comprising receiving the image and decomposing the image into said set of scaled images.

3. The method of claim 1, wherein said decomposing comprises selecting a size of said set based on a size of the image.

4. The method of claim 1, wherein said decomposing comprises determining an amount of information in each scaled image being formed, and ceasing said decomposing when said amount of information is below a predetermined threshold.

5. The method according to claim 1, wherein a characteristic dynamic range of said combined image is lower than a characteristic dynamic range of the original image.

6. The method according to claim 1, wherein said combining comprises multiplying.

7. The method according to claim 1, wherein said processing comprises modulating each relative luminance to provide a plurality of modulated relative luminance levels, wherein said combining comprises combining said modulated relative luminance levels.

8. The method according to claim 1, wherein said set is an ordered set and wherein said relative luminance is expressed as function of a ratio between said intensities in said scaled image and said intensities in said other scaled image.

9. The method according to claim 1, wherein said image-specific effective saturation function comprises an image-specific exponent, which is a function of a local contrast within said scale-image.

10. The method according to claim 9, wherein said processing comprises modulating each relative luminance to provide a plurality of modulated relative luminance levels, wherein said combining comprises combining said modulated relative luminance levels.

11. The method according to claim 10, wherein said modulating comprises selecting a relative luminance level such that two effective saturation functions corresponding to different image-specific exponent but the same scale be substantially matched.

12. The method according to claim 9, wherein said local contrast is calculated using a contrast-based adaptation procedure employed for each picture-element of said scaled image.

13. The method according to claim 12, wherein said contrast-based adaptation procedure calculates said local contrast based on a difference between a second order opponent receptive field function calculated for said picture-element and a second order opponent receptive field function calculated for nearby picture-elements.

14. The method according to claim 9, wherein said image-specific exponent is a decreasing function of said local contrast.

15. The method according to claim 14, wherein said image-specific exponent is a linear decreasing function of said local contrast.

16. The method according to claim 1, wherein said image-specific effective saturation function comprises a modulation function which is calculated based on a local contrast.

17. The method of claim 16, wherein said modulation function has higher values when said local contrast is low, and lower values when said local contrast is high.

18. The method according to claim 1, further comprising employing a global gain operation for all scaled images of said set.

19. The method according to claim 18, wherein said global gain operation features a global gain exponent, and the method further comprises calculating said global gain exponent using an optimization procedure.

20. The method of claim 18, wherein said optimization procedure comprises selecting a set of candidate gain exponents, assigning a score to each candidate gain exponent, and selecting said gain exponent responsively to said score.

21. The method of claim 20, wherein said score comprises a characteristic contrast.

22. The method according to claim 1, wherein said set is an ordered set and wherein said scaled image and said other scaled image are adjacent images in said set.

23. The method according to claim 1, wherein the image is an HDR image.

24. The method according to claim 1, wherein the image is of at least one type selected from the group consisting of a visible light image, a stills image, a video image, an X-ray image, an infrared image, a thermal image, a ultraviolet image, a computerized tomography (CT) image, a mammography image, a Roentgen image, a positron emission tomography (PET) image, a magnetic resonance image, an ultrasound images, an impedance image, an elastography image, and a single photon emission computed tomography (SPECT) image.

25. A method of capturing and displaying an image, comprising capturing an image of a scene and processing the image using the method according to claim 1.

26. The method of claim 25, wherein said capturing the image comprises recording radiation selected from the group consisting of visible light, infrared light, ultraviolet light, X-ray radiation, radiofrequency radiation, microwave radiation and ultrasound radiation.

27. A non-transitory computer software product, comprising a non-transitory computer-readable medium in which program instructions are stored, which instructions, when read by a computer, cause the computer to execute the method of claim 1.

28. A system for processing an image, the system comprises a data processor configured for:
obtaining an image decomposed into a set of scaled images, each being characterized by a different image-scale;
calculating, for each scaled image of said set, a relative luminance between said scaled image and another scaled image of said set using intensities in said scaled image and intensities in said another scaled image;
processing each scaled image of said set using an adaptation procedure featuring an image-specific effective saturation function of said relative luminance, thereby providing a processed scaled image; and
combining at least some of the processed scaled images to provide a combined image.

29. The system according to claim 28, wherein said data processor is configured for receiving the image and decomposing the image into said set of scaled images.

30. An imaging system, comprising an image capturing system and the system according to claim 28.

31. The imaging system of claim 30, wherein said capturing system is selected from the group consisting of a digital camera, a video camera, a CMOS digital camera, an infrared camera, a thermography device, an X-ray camera, a scanner, a microwave imaging, a computerized tomography scanner, a single photon emission computed tomography device, a positron emission tomography device, a magnetic resonance imaging scanner, a mammography scanner, an ultrasonic scanner, an impedance imaging system, an endoscopic imaging device, an elastography device, a radio telescope, a digital telescope, a digital microscope and a system for translating an analog image to a digital image.

* * * * *